United States Patent
Liang et al.

(10) Patent No.: US 10,276,149 B1
(45) Date of Patent: Apr. 30, 2019

(54) DYNAMIC TEXT-TO-SPEECH OUTPUT

(71) Applicant: Amazon Technologies, Inc., Seattle, WA (US)

(72) Inventors: Nancy Yi Liang, Seattle, WA (US); Aaron Takayanagi Barnet, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/386,333

(22) Filed: Dec. 21, 2016

(51) Int. Cl.
| | |
|---|---|
| *G10L 13/033* | (2013.01) |
| *G10L 13/10* | (2013.01) |
| *G10L 25/90* | (2013.01) |
| *G10L 25/87* | (2013.01) |
| *G06F 17/24* | (2006.01) |
| *G10L 15/22* | (2006.01) |
| *G10L 17/06* | (2013.01) |
| *G10L 13/04* | (2013.01) |

(52) U.S. Cl.
CPC ............ *G10L 13/10* (2013.01); *G06F 17/248* (2013.01); *G10L 13/033* (2013.01); *G10L 13/04* (2013.01); *G10L 15/22* (2013.01); *G10L 17/06* (2013.01); *G10L 25/87* (2013.01); *G10L 25/90* (2013.01); *G10L 2013/105* (2013.01); *G10L 2015/223* (2013.01)

(58) Field of Classification Search
CPC ............................ G10L 15/22; G10L 13/033
See application file for complete search history.

(56) References Cited

U.S. PATENT DOCUMENTS

| | | | | |
|---|---|---|---|---|
| 9,047,054 | B1* | 6/2015 | Goldstein | G06F 3/165 |
| 2003/0167167 | A1* | 9/2003 | Gong | G10L 13/033 |
| | | | | 704/250 |
| 2006/0287850 | A1* | 12/2006 | Morikawa | G10L 15/22 |
| | | | | 704/200 |
| 2009/0254342 | A1* | 10/2009 | Buck | G10L 15/222 |
| | | | | 704/233 |
| 2011/0202345 | A1* | 8/2011 | Meyer | G10L 13/033 |
| | | | | 704/260 |
| 2011/0223893 | A1* | 9/2011 | Lau | G10L 15/22 |
| | | | | 455/414.1 |
| 2013/0250034 | A1* | 9/2013 | Kang | H04W 4/02 |
| | | | | 348/14.02 |
| 2014/0019141 | A1* | 1/2014 | Park | G10L 15/22 |
| | | | | 704/275 |

(Continued)

*Primary Examiner* — Douglas Godbold
(74) *Attorney, Agent, or Firm* — Pierce Atwood LLP

(57) ABSTRACT

Systems, methods, and devices for dynamically outputting TTS content are disclosed. A speech-controlled device captures a spoken command, and sends audio data corresponding thereto to a server(s). The server(s) determines output content responsive to the spoken command. The server(s) may also determine a user that spoke the command and determine an average speech characteristic (e.g., tone, pitch, speed, number of words, etc.) used by the user when speaking commands. The server(s) may also determine a speech characteristic of the presently spoken command, as well as determine a difference between the speech characteristic of the presently spoken command and the average speech characteristic of the user. The server(s) may then cause the speech-controlled device to output audio based on the difference.

20 Claims, 24 Drawing Sheets

(56) References Cited

U.S. PATENT DOCUMENTS

| | | | |
|---|---|---|---|
| 2014/0222432 A1* | 8/2014 | Ahn | G10L 15/1822 704/257 |
| 2014/0278395 A1* | 9/2014 | Zurek | G10L 15/065 704/233 |
| 2014/0303971 A1* | 10/2014 | Yi | H04M 1/605 704/233 |
| 2015/0010169 A1* | 1/2015 | Popova | H04S 7/303 381/107 |
| 2015/0348548 A1* | 12/2015 | Piernot | G10L 15/22 704/235 |
| 2016/0104483 A1* | 4/2016 | Foerster | G10L 15/02 704/275 |
| 2016/0253146 A1* | 9/2016 | Yang | H04N 5/60 381/107 |
| 2016/0379638 A1* | 12/2016 | Basye | G06F 17/30764 704/235 |
| 2017/0004821 A1* | 1/2017 | Hirano | G10L 13/10 |
| 2017/0083281 A1* | 3/2017 | Shin | G10L 13/00 |
| 2017/0161320 A1* | 6/2017 | Venkataraman | G06F 17/30401 |
| 2017/0358301 A1* | 12/2017 | Raitio | G10L 13/033 |

* cited by examiner

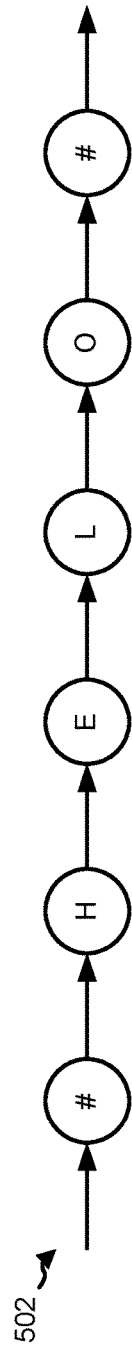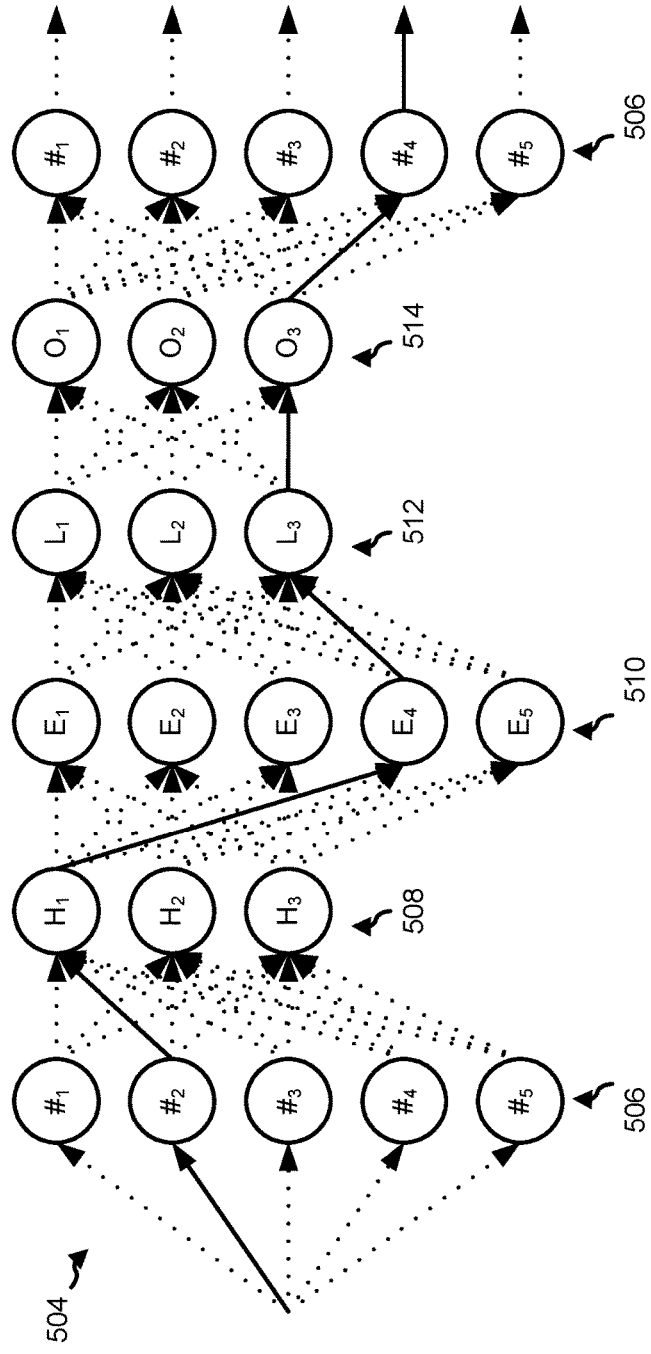
FIG. 5B

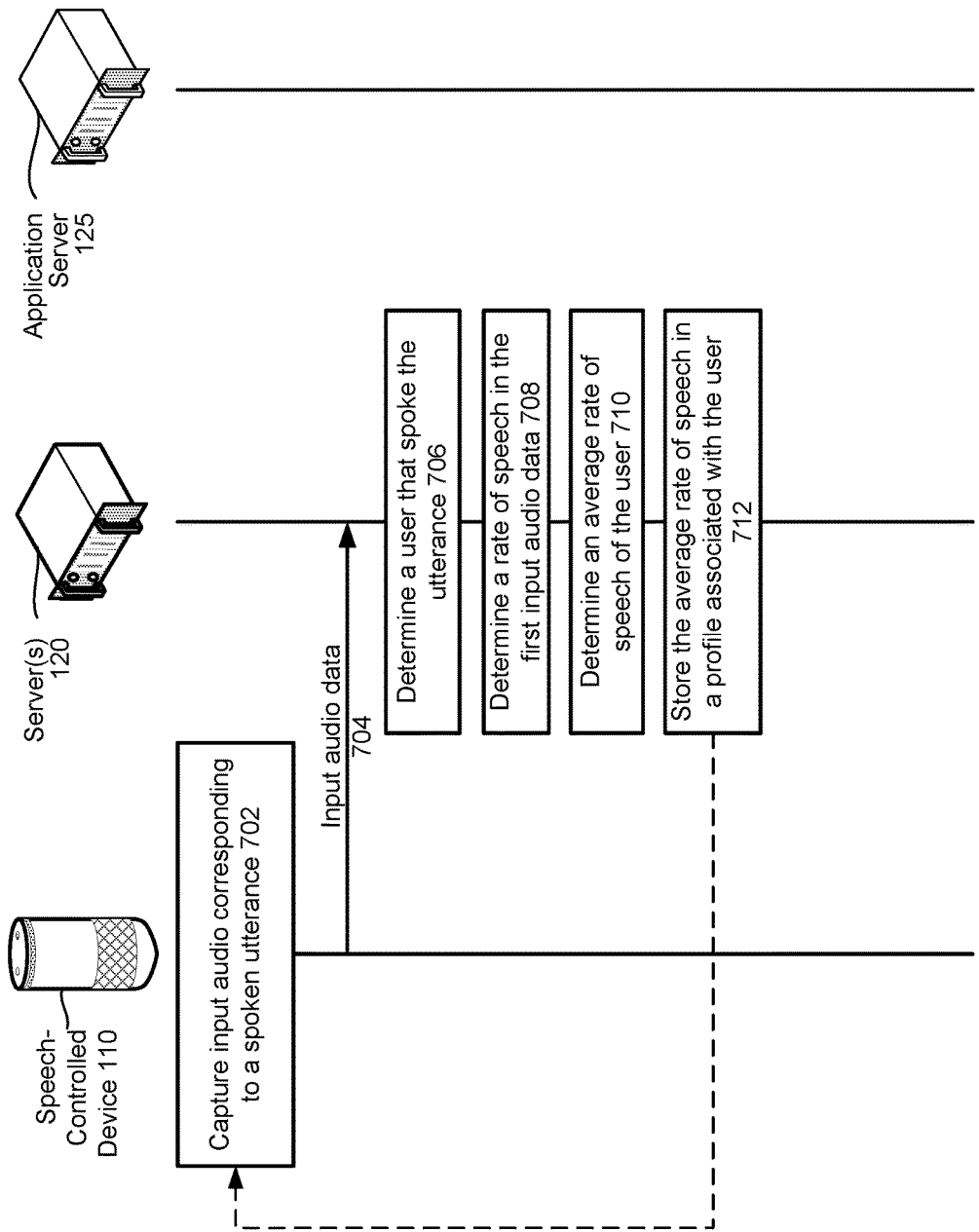

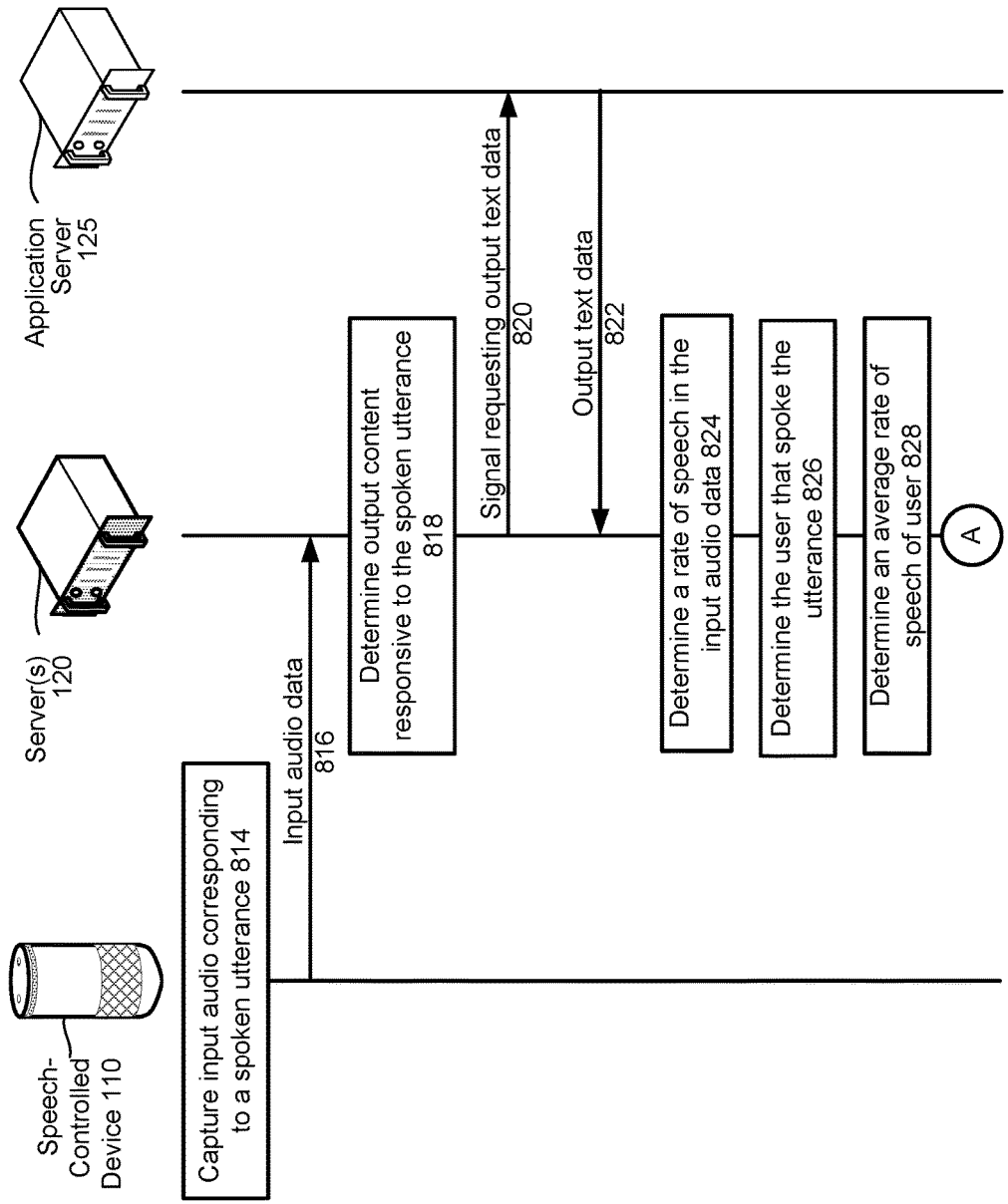

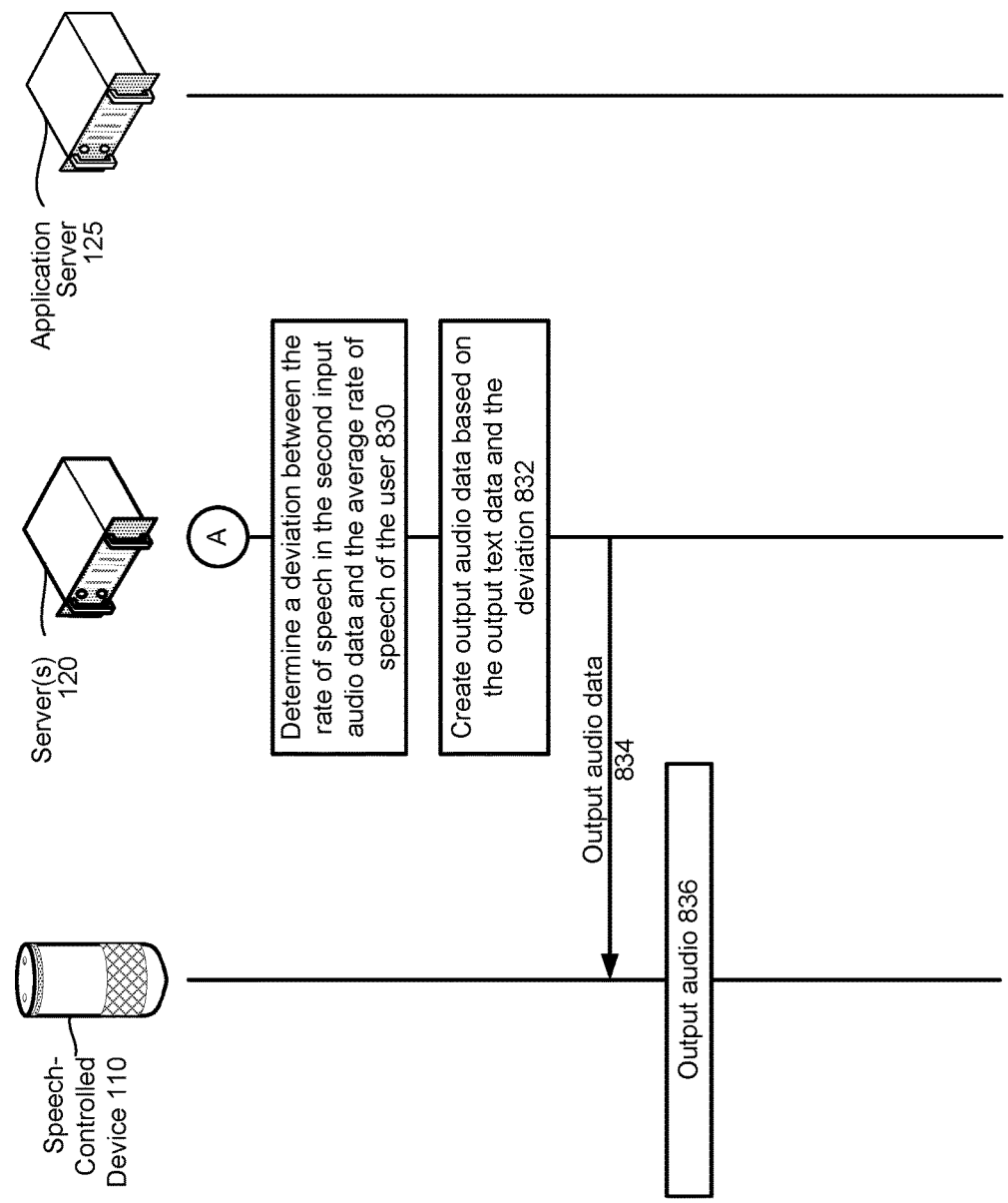

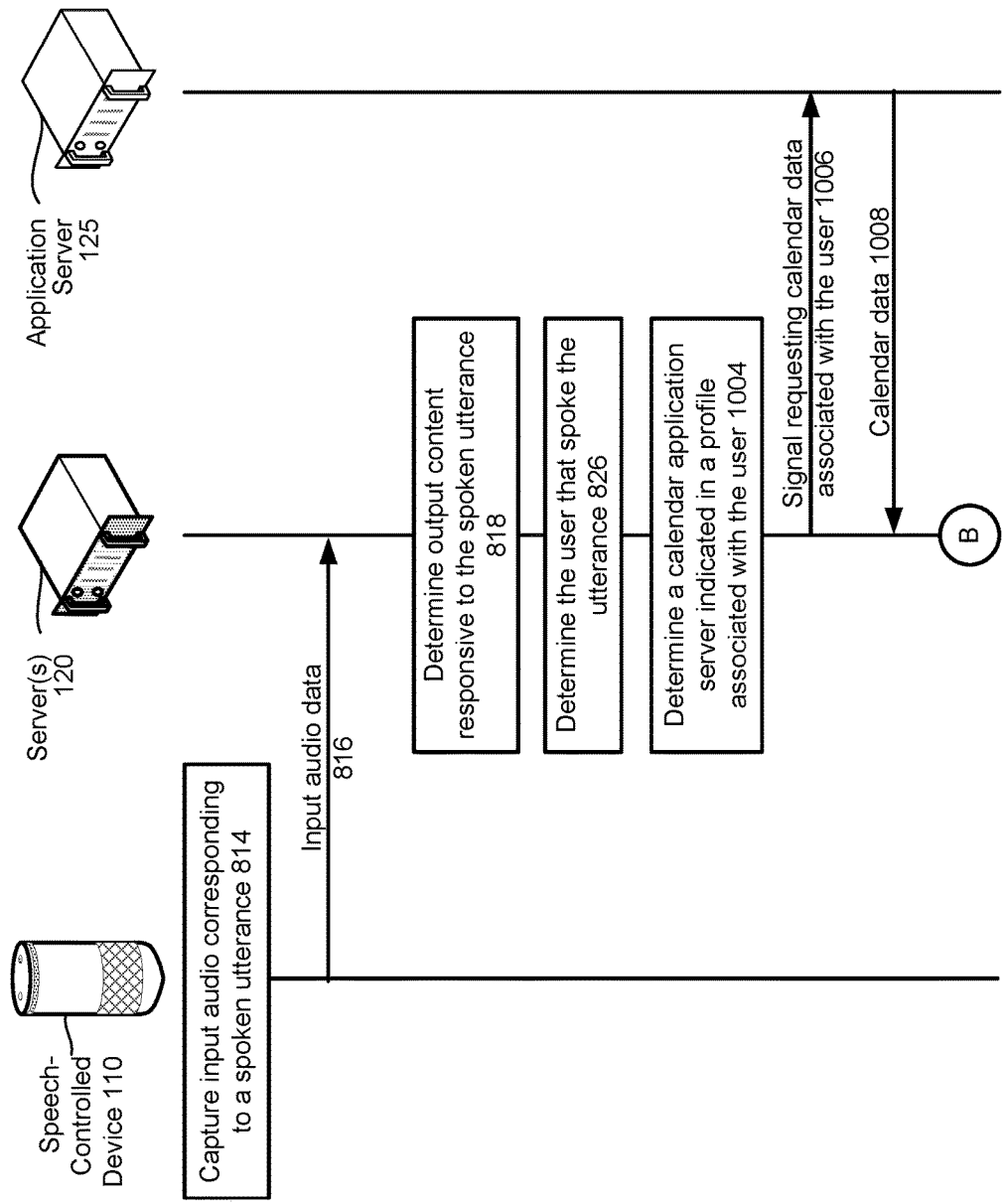

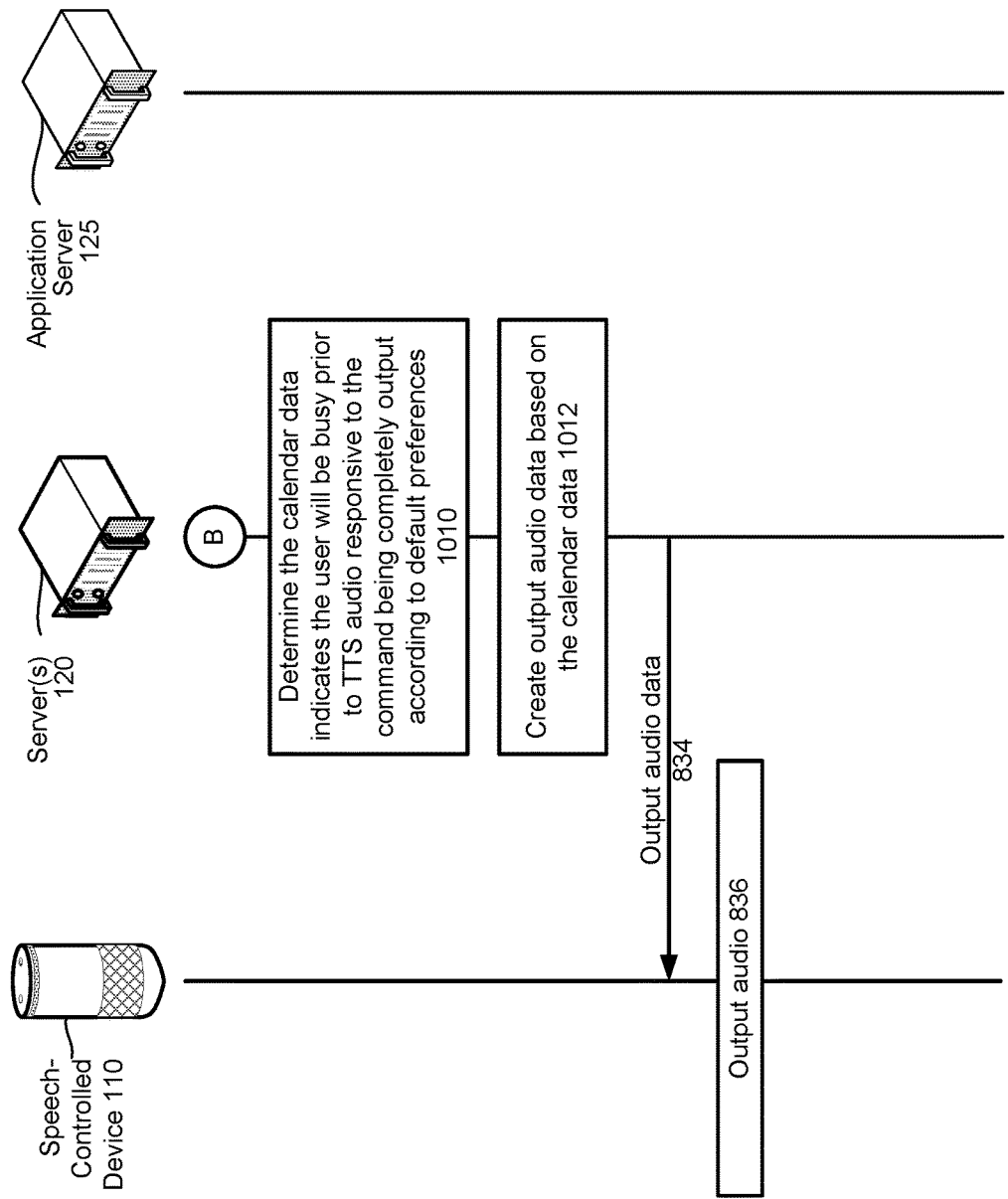

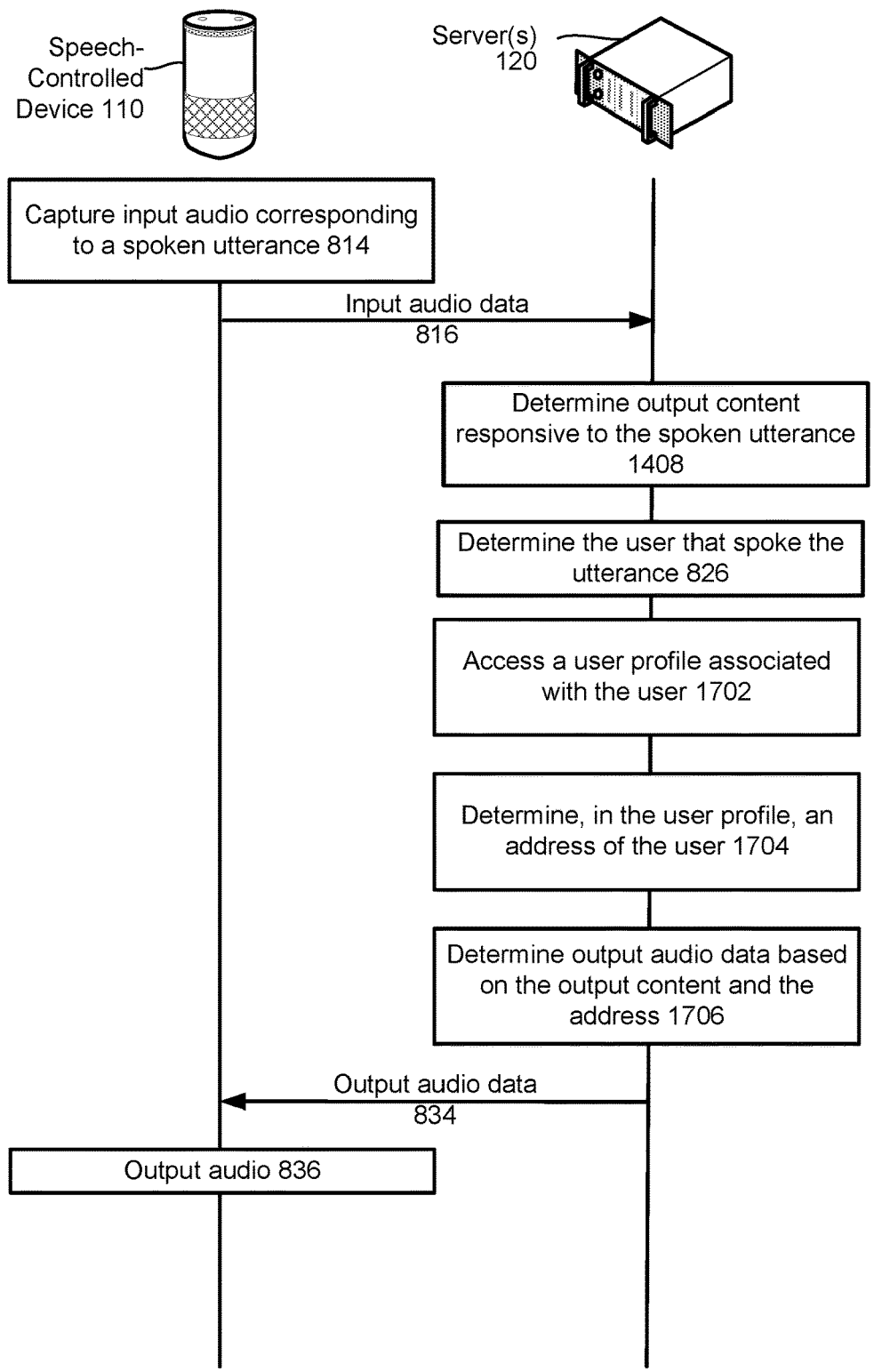

DYNAMIC TEXT-TO-SPEECH OUTPUT

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 5A and 5B illustrate speech synthesis using unit selection according to one aspect of the present disclosure.

FIG. 7 is signal flow diagram illustrating training a system to determine an average rate of speed for a particular user FIGS. 8A through 8B are a signal flow diagram illustrating dynamically selecting TTS output based on a rate of speech of a spoken command according to embodiments of the present disclosure.

FIGS. 10A and 10B are a signal flow diagram illustrating dynamically selecting TTS output based on data of a user's electronic calendar according to embodiments of the present disclosure.

FIG. 17 is a signal flow diagram illustrating dynamically selecting TTS output based on a geographic location associated with a user according to embodiments of the present disclosure.

DETAILED DESCRIPTION

Figure 1:
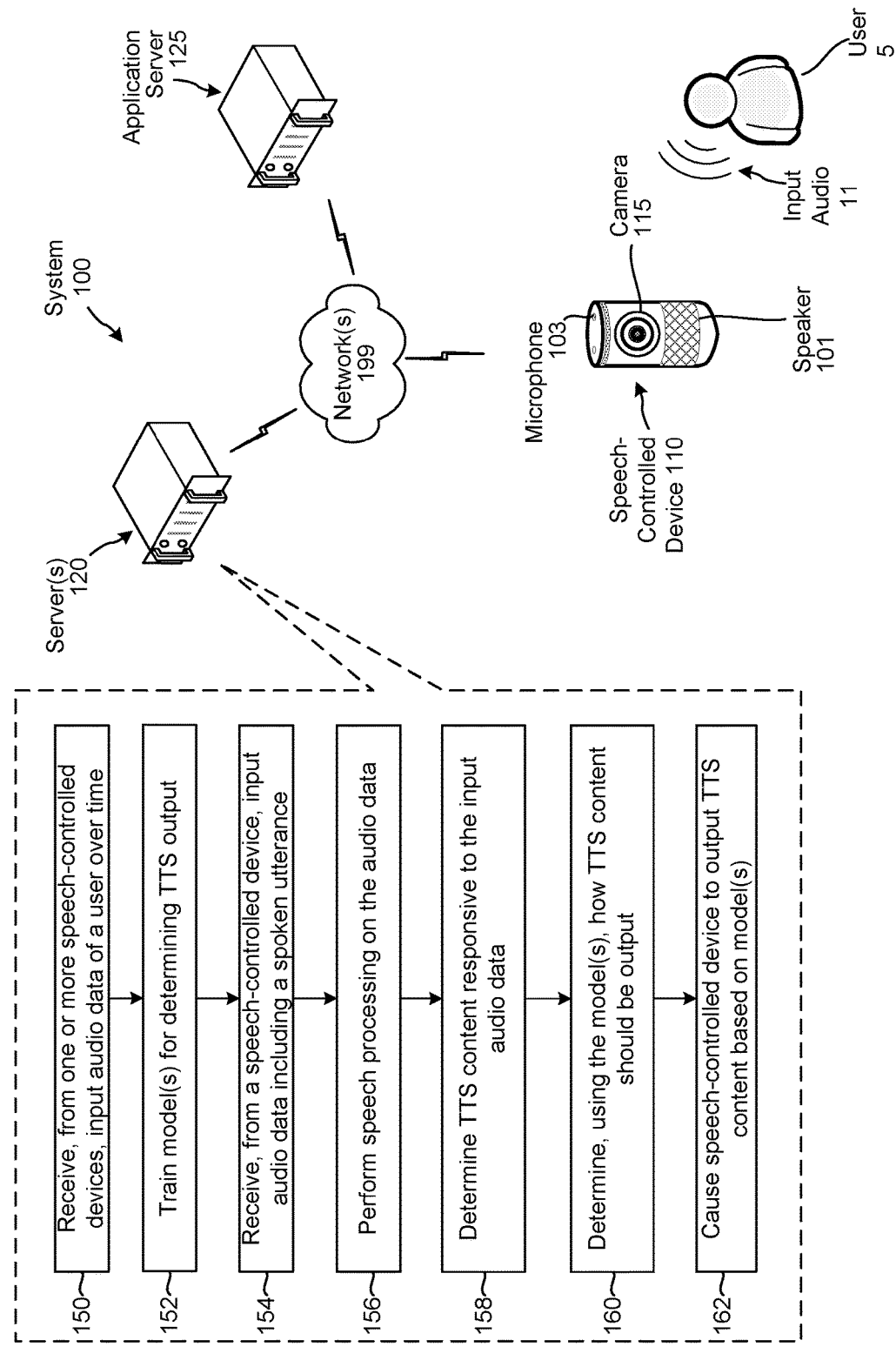
FIG. 1 illustrates a system for dynamically outputting TTS content according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Speech processing systems have become robust platforms enabled to perform a variety of speech related tasks such as playing music, controlling household devices, communicating with other users, shopping, etc. Speech processing systems may process a spoken utterance to obtain content responsive thereto (for example output music, news content, weather content, or the like). Speech processing systems may also process a spoken utterance, and therefrom perform TTS processing to create computer-generated speech responsive to the spoken utterance thus enabling the system to engage in a conversation with a user and provide feedback and prompts in spoken form. The data used to perform TTS may come from various data sources in order to respond to a user command, for example answering a knowledge query with information obtained from a knowledge base, providing weather information in response to a query about the weather, or the like.

A speech processing system may include default preferences that cause the speech processing system to output certain portions of TTS content for each command executable by the speech processing system. For example, TTS speech generated in response to a command soliciting the weather (e.g., by the user saying "what is the weather like outside today") may be defaulted to include a preface portion, a high temperature portion, and a low temperature portion (e.g., the TTS output may include "today the temperature will have a high of 70 and a low of 60") along with potential further data such as a portion regarding precipitation, emergency information, or the like. Various system defaults may determine the quantity of information provided to a user.

A speech processing system may also include default preferences that cause the speech processing system to output TTS speech at a certain speed. Such speech may be measured in, for example, words per minute, phonemes per second, etc. For certain systems TTS speech speed may be configured to be relatively constant to provide a uniform customer experience.

In certain situations, however, outputting all default quantities of TTS content and/or outputting TTS speech at the default speed may be undesirable. A user may be in a hurry or have a meeting scheduled for shortly in the future such that the user will be delayed and/or miss the beginning of the meeting if all the default portions of TTS content are output and/or if the TTS speech is output at the default speed.

The present disclosure is directed to techniques for providing a more desirable user experience by providing dynamic TTS output. According to the present disclosure, the speech processing system may dynamically alter default preferences that cause the speech processing system to output certain quantities of TTS content and/or output TTS content at a certain speed.

The speech processing system's TTS settings may be altered based on a number of or an average number of words spoken to invoke a command executable by the speech processing system. An average number of words may be determined from previous spoken utterances of a user invoking a given command. Thereafter, when the user speaks an utterance invoking the same command, the speech processing system may determine a number of words of the presently spoken utterance, determine a deviation of the present number of words from the average number of words, and therefrom alter output of the TTS content accordingly. For example, the user may typically invoke a weather command by stating "what is the weather like outside today", and the speech processing system may typically output preface content, high temperature content, and low temperature content (e.g., "the weather today will be sunny with a high of 70 and a low of 60"). If, thereafter, the user invokes the weather command by stating "what's the weather" (i.e., a shortened spoken utterance as compared to the user's typical spoken utterances invoking the weather command), the speech processing system may omit certain portions of content from the TTS output (e.g., the speech processing system may output "sunny and 70"). Further an even more truncated request such as "weather" may result in a further truncate response such as "it's nice."

The speech processing system's TTS settings may also be altered based on contents of a user's electronic calendar. Using the example above, the user may invoke a weather command by stating "what is the weather like outside today", and the speech processing system may typically output preface content, high temperature content, and low temperature content (e.g., "the weather today will have a high of 70 and a low of 60"). If the speech processing system determines an electronic calendar of the user indicates a meeting will start prior to the default TTS output being completely output, the speech processing system may speed up the TTS output and/or omit portions of the default TTS content from being output.

The speech processing system's TTS settings may additionally be altered based on speech characteristics of spoken utterances. Average speech characteristics (e.g., pitch, tone, speed, urgency, etc.) may be determined from previous spoken utterances of a user. Thereafter, when the user speaks an utterance, the speech processing system may determine speech characteristics of the presently spoken utterance, determine a deviation of the present speech characteristics from the average speech characteristics, and therefrom alter output of the TTS content accordingly. These determinations may or may not be determined on a specific command (e.g., weather, etc.) basis. For example, if a user speaks an utterance in a higher pitch as compared to the user's average pitch, the speech processing system may determine the user is in a hurry, and may therefrom speed up output of TTS content and/or omit portions of TTS content from being output. Other situations may also cause the speech processing system to alter its TTS settings.

FIG. 1 illustrates a system 100 configured to dynamically output TTS content according to the present disclosure. Although the figures and discussion illustrate certain operational steps of the speech processing system 100 in a particular order, the steps described may be performed in a different order (as well as certain steps removed or added) without departing from the intent of the disclosure. As shown in FIG. 1, the speech processing system 100 may include one or more speech-controlled devices 110 local to a user 5, and one or more servers 120 connected to the speech-controlled device(s) 110 across one or more networks 199. The server(s) 120 (which may be one or more different physical devices) may be capable of performing speech processing (e.g., ASR, NLU, command processing, etc.), and TTS processing as described herein. A single server 120 may perform all speech processing, command execution and TTS processing. Alternatively, multiple servers 120 may combine to perform all speech processing TTS processing. Further, the server(s) 120 may execute certain commands, such as answering spoken utterances of the user 5. In addition, certain speech detection or command execution functions may be performed by the speech-controlled device 110.

As illustrated in FIG. 1, the speech-controlled device 110 may capture spoken utterances (i.e., input audio 11) of the user 5 via a microphone 103 of the speech-controlled device 110. The speech-controlled device 110 may then send input audio data corresponding to the input audio 11 to the server(s) 120. Alternatively, a microphone array (not illustrated), separate from the speech-controlled device 110, may capture some or all of the input audio 11. In an example, the microphone array is in direct communication with the speech-controlled device 110 such that when the microphone array captures input audio 11, the microphone array sends input audio data (corresponding to the input audio 11) to the speech-controlled device 110. The speech-controlled device 110 may then forward the received input audio data to the server(s) 120. In another example, the microphone array is in indirect communication with the speech-controlled device 110 via a companion application of a mobile computing device, such as a smart phone, tablet, laptop, etc. In this example, when the microphone array captures input audio 11, the microphone array sends input audio data to the companion application, which forwards the input audio data to the speech-controlled device 110. The speech-controlled device 110 may then forward the input audio data to the server(s) 120. In yet another example, the microphone array is in indirect communication with the server(s) 120 via the companion application such that when the microphone array captures input audio 11, the microphone array sends input audio data to the companion application, which forwards the input audio data to the server(s) 120.

The server 120 receives (150) input audio data, specific to the user 5, over time. The server(s) 120 may train (152) one or more models for determining TTS output using the received input audio data. It should be appreciated that the speech processing system 100 may configure models specific to users of the speech processing system. For example, a first user of the speech processing system 100 may have two (2) TTS models associated therewith, a second user of the speech processing system 100 may have four (4) TTS models associated therewith, etc. One model of a user may be configured to alter the speech processing system's TTS preferences based on rate of speech of a command. Another model of a user may be configured to alter the speech processing system's TTS preferences based on an electronic calendar of the user. Other models may also be used.

Thereafter, the speech-controlled device 110 may capture (either using the microphone 103 or a separate microphone array) input audio 11 corresponding to a spoken utterance. The server(s) 120 may receive (154) input audio data at least partially corresponding to the input audio 11 from the speech-controlled device 110. The server(s) 120 may perform (156) speech processing (e.g., ASR and NLU) on the input audio data. The server(s) 120 may therefrom determine (158) TTS content responsive to the input audio data. To determine the TTS content, the server(s) 120 may determine a content source (e.g., an application of the server(s) 120 or an external content source such as an application server 125) storing or having access to content responsive to the input audio data. The server 120 may receive text data from the content source, and may perform TTS processing (described in detail herein below) on the received text data to create the TTS content.

The server(s) 120 determine (160) how to alter default TTS output preferences of the speech processing system 100 using the previously trained model(s). The server(s) 120 may alter the default TTS output preferences based on gaps between words spoken in a command. For example, if there is little space between words, the TTS may be output faster than if there are larger spaces between words. The server(s) 120 may cause (162) the speech-controlled device 110 (or another device indicated in a profile associated with the user 5) to output the altered TTS content.

Figure 2:
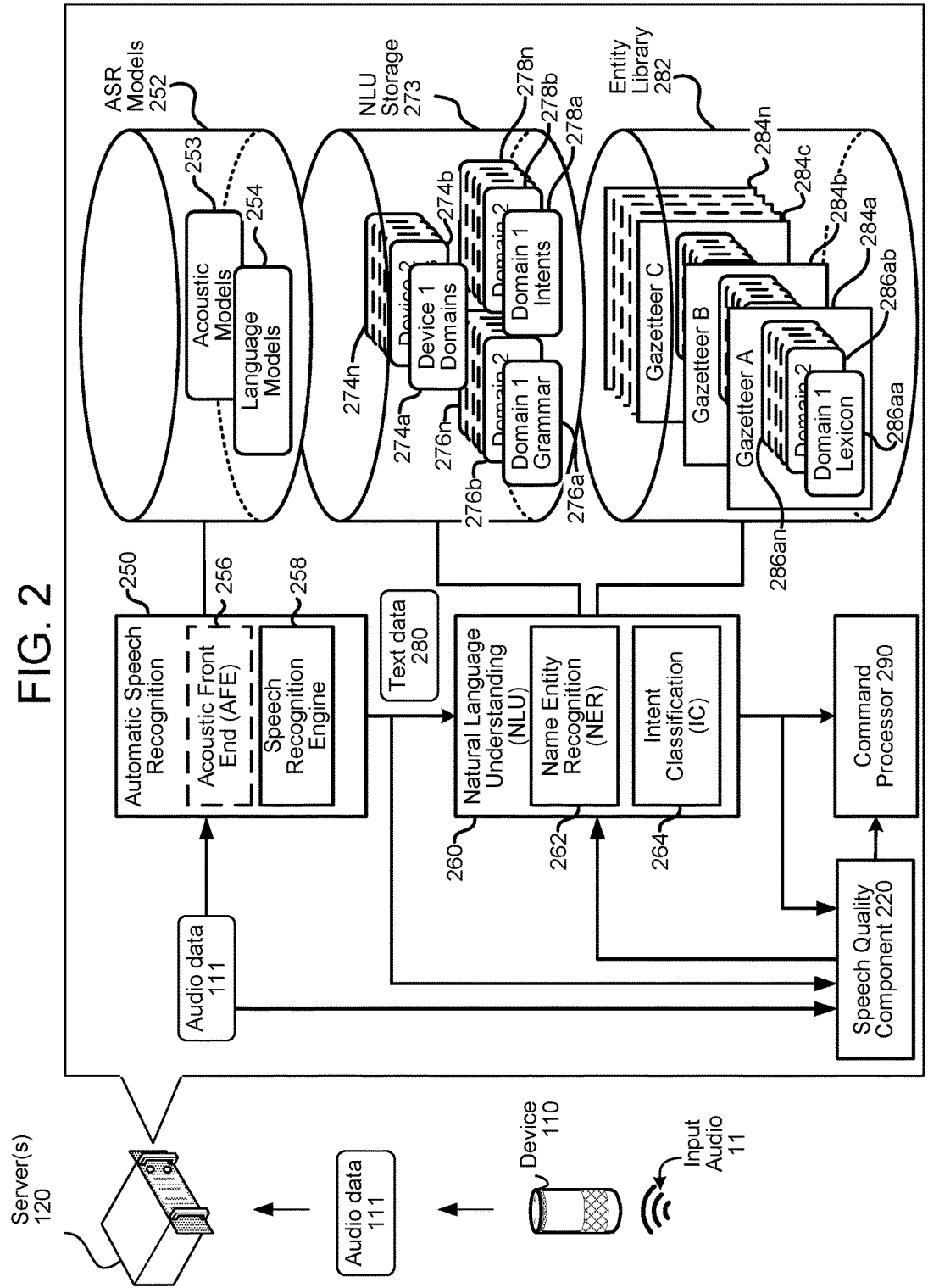
FIG. 2 is a conceptual diagram of how a spoken utterance may be processed according to embodiments of the present disclosure.

Further details of the speech processing system 100 configured to dynamically output TTS content are explained below, following a discussion of the overall speech processing system of FIG. 2. The system 100 of FIG. 1 may operate using various speech processing components as described in FIG. 2. FIG. 2 is a conceptual diagram of how a spoken utterance is processed. The various components illustrated may be located on a same or different physical devices. For example, multiple different servers 120 may perform ASR, multiple different servers may perform NLU, multiple different servers may execute commands using command processors 290, etc. Communication between various components illustrated in FIG. 2 may occur directly or across a network 199. An audio capture component, such as a microphone 104 of device 110, captures audio 11 corresponding to a spoken utterance. The device sends audio data 111 corresponding to the utterance, to an ASR component 250. The audio data 111 may be output from an acoustic front end (AFE) 256 located on the device 110 prior to transmission. Or the audio data 111 may be in a different form for processing by a remote AFE 256, such as the AFE 256 located with the ASR component 250.

An ASR process 250 converts the audio data 111 into text. The ASR transcribes audio data into text data 280 representing the words of the speech contained in the audio data.

The text data 280 may then be used by other components for various purposes, such as executing system commands, inputting data, etc. The text data 280 may also be used by a speech quality component 220 to determine some indication of a length of an utterance for purposes of determining a length of a TTS response. The speech quality component 220 may generate and/or process speech synthesis markup language (SSML) or other metadata tags indicating how output audio should be generated/output by the speech-controlled device 110. The SSML or other metadata tags may be received by the NLU component 260 separate from or along with the text data 280. The speech quality component 220 may send the SSML or other metadata tags to the command processor 290. This enables the command processor 290 to determine output content based on the SSML or other metadata tags. Alternatively, or in addition, the speech quality component 220 may send the SSML or other metadata tags to the TTS component 314. This enables the TTS component 314 to generate speech based on output content received from the command processor 290 and having a length and/or output speed as indicated by the SSML or other metadata tags. Further, the NLU component 260 may receive data regarding the input utterance from the speech quality component 220 which the NLU component 260 may interpret as corresponding to a particular characteristic of the input utterance that should impact the output data corresponding to the utterance. Thus the NLU component 260 may output an indicator to a command processor 290 corresponding to how the output data should be formatted/output. Examples of such indicators may include, for example, [fast], [slow], [short], [long], [user in a hurry], etc.

A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data from the microphone into data for processing by the speech recognition engine 158. The speech recognition engine 258 compares the speech recognition data with acoustic models 253, language models 254, and other data models and information for recognizing the speech conveyed in the audio data. The AFE 256 may reduce noise in the audio data and divide the digitized audio data into frames representing time intervals for which the AFE 256 determines a number of values, called features, representing the qualities of the audio data, along with a set of those values, called a feature vector or audio feature vector, representing the features/qualities of the audio data within the frame. Many different features may be determined, as known in the art, and each feature represents some quality of the audio that may be useful for ASR processing. A number of approaches may be used by the AFE 256 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage 252. Alternatively, post front-end processed data (such as feature vectors) may be received by the device executing ASR processing from another source besides the internal AFE 256. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing 260 may include a named entity recognition (NER) component 252, intent classification (IC) component 264, NLU storage 273 and a and knowledge base (not shown). The knowledge base is a database or other information storage that may include information about entities that may be used in resolving user queries. The NLU process may also utilize gazetteer information (284a-284n) stored in entity library storage 282. The knowledge base and/or gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 260 takes textual input (such as processed from ASR 250 based on the utterance 11) and attempts to make a semantic interpretation of the text. That is, the NLU process 260 determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process 260 may be configured to parse and tag to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition component 262 receives a query in the form of ASR results and attempts to identify relevant grammars and lexical information that may be used to construe meaning. To do so, a name entity recognition component 262 may begin by identifying potential domains that may relate to the received query. The NLU storage 273 includes a database of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query may be processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) component 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC component 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the query to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (in the NLU's storage 273). For instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the voice-controlled device "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of the system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search query (for example, requesting the return of search results), the destination command processor 290 may include a search engine processor, such as one located on a search server, configured to execute a search command and determine search results, which may include output text to be processed by a TTS engine and output from a device as synthesized speech.

Typically, an ASR system may be capable of performing speech recognition on speech of various qualities, without specific regard to those certain qualities. For example, an ASR system may be capable of converting an utterance to text regardless of whether that utterance is whispered, spoken in an excited voice, spoken in a sad voice, whined, shouted, etc. In fact, traditional ASR systems do not care about such voice qualities. Instead, traditional ASR systems only care about recognizing the words in the speech, not any paralinguistic qualities.

The present system may be configured to detect speech quality/qualities and determine a label/tag corresponding to the detected qualities that may be applied to an utterance in the speech and used for later processing. The speech quality may be based on paralinguistic metrics that describe some quality/feature other than the specific words spoken. Paralinguistic features may include acoustic features such as speech tone/pitch, rate of change of pitch (first derivative of pitch), speed, prosody/intonation, resonance, energy/volume, hesitation, phrasing, nasality, breath, whether the speech includes a cough, sneeze, laugh or other non-speech articulation (which are commonly ignored by ASR systems), detected background audio/noises, distance between the user and a device, etc.

Current ASR systems may be configured to detect some such paralinguistic features, however current systems are not configured to analyze those features to put a descriptive label on the speech (such as to indicate a speed at which the speech was spoken, a number of words of an utterance/command corresponding to input audio, a length of the audio data, etc.) in order to pass that label/tag as an input to downstream processing, such as coordinating the voicing of the input utterance with the voicing of TTS output or execution of a command included in the utterance. The present system includes a speech quality component 220, as shown in FIG. 2. The speech quality component 220 may process the audio data 111 to determine if the incoming audio data includes certain characteristics that apply to incoming speech (e.g., slow speech speed, regular speech speed, fast speech speed, short utterance, regular length utterance, long utterance, etc.). The speech quality component 220 may process paralinguistic feature data to classify one or more qualities of incoming speech and then alter downstream/output operation in response to the one or more qualities. The speech quality component 220 may also process the text data 280 determined from the input audio data (for example using the output of ASR component 250 and/or output of NLU component 260) to determine if the incoming audio includes certain characteristics (such as short utterance, regular length utterance, long utterance, etc.).

The speech quality component 220 may implement a single model that outputs a label, or may implement a plurality of models, each configured to determine, based on feature values input to the model, whether the speech corresponds to a particular quality. For example one model may be configured to determine a speed at which a user spoke the audio. Or, as noted, a single model may be configured to determine a length of a spoken command in the input audio. The speech quality component 220 may operate within an ASR sub-system, or as a separate component as part of system 100.

The system may also consider non-audio data and non-audio features when determining a quality of the speech. For example, if a camera detects the speaker, the system may analyze the image data (for example, the image data may be input to the speech quality component 220) to determine some quality of the speaker (agitated, subdued, angry, etc.) that the speech quality component 220 may consider. For example, if the image data indicates the speaker is moving towards a door, the speech quality component 220 may tag/label the input audio such that system output therefrom is short or fast. For further example, if the image data indicates the speaker is lying down (e.g., on a couch or bed), the speech quality component 220 may tag/label the input audio such that system output therefrom is normal/slow speed or normal/long length. Other non-audio data may also be input to the speech quality component 220. For example, time/date data, location data (for example GPS location or relative indoor room location), ambient light data from a light sensor, the identity of other nearby individuals to the speaker, proximity of the user to a device (for example, if a user is leaning in close to a device to speak an utterance, or if a user is far away from the device), etc.

The types of acoustic and non-audio data considered by the speech quality component 220 depends on the types of such data available to the system 100 when processing an utterance. The model(s) available to the speech quality component 220 may be trained on the various data types available to the speech quality component 220. For example a first model may be trained to detect a speed at which speech is spoken whereas a second model may be trained to determine that image data from a camera indicates a speaker moving towards a door. The output from the second model (or more simply, an output from a component such as the camera) may indicate to the first model that the speaker is in a hurry, which may be used to increase a confidence of the first model that the input speech was spoken fast and/or with a minimal amount of words. Other such non-audio data may be used to inform a model trained to determine a quality of input speech based on how the non-audio data impacts the classification of the input speech quality.

Various machine learning techniques may be used to train and/or operate the machine learning models that may be used by the speech quality component 220. In machine learning techniques, an adaptive system is "trained" by repeatedly providing it examples of data and how the data should be processed using an adaptive model until it can consistently identify how a new example of the data should be processed, even if the new example is different from the examples included in the training set from which it learned. Getting an adaptive model to consistently identify a pattern is in part dependent upon providing the system with training data that represents the desired decision features in such a way that patterns emerge. Being provided data with consistent patterns and recognizing such patterns when presented with new and different data is within the capacity of today's systems, and is in fact used by a wide variety of computer systems ranging from handheld personal consumer electronics to complex massively parallel supercomputers. Such efforts fall into the discipline often referred to as "machine learning," which is a sub-discipline of artificial intelligence (also known as machine intelligence).

For example, as above, an adaptive system may be trained using example audio data segments and different values for the various paralinguistic data features available to the system. Different models may be trained to recognize different speech qualities and/or utterance lengths or a single model may be trained to identify applicable speech qualities/utterance lengths associated with a particular utterance. For example, a single model may be trained to analyze both audio and non-audio data to determine a speech quality. Alternatively, certain model(s) may be trained to analyze audio data and a separate model(s) may be trained to analyze non-audio data.

Example machine learning techniques include, for example neural networks, inference engines, trained classifiers, etc. Examples of trained classifiers include support vector machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers (either binary or multiple category classifiers) may issue a "score" indicating which category the data most closely matches. The score may provide an indicator of how closely the data matches the category. For example, in the present application, a support vector machine (SVM) may be trained/configured to process audio data, for example audio feature vectors, to determine if speech associated with the audio feature vectors was shouted/emphasized.

Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used to train the models used in the first stage and second stage.

For example, a model, such as an SVM classifier, may be trained to recognize a length of the utterance. The length may be measured, for example, by a rate of speech of the utterance, the number of words of the utterance, or the like. For example, a model may be trained to recognize a speed at which an utterance is spoken using many different training utterances, each labeled "fast," "normal," "slow," etc. For further example, the model or another model may be trained to recognize a length of an utterance judged by a number of words in the utterance using many different training utterances, each labeled "short," "normal," "long," etc. Each training utterance may also be associated with various feature data corresponding to the respective utterance, where the feature data indicates values for the acoustic and/or non-audio paralinguistic features that may be used to determine how fast a future utterance is spoken and/or how long a future utterance is. The model may be constructed based on the training utterances and then disseminated to individual devices 110 or to server(s) 120. A speech quality component 220 may then use the model(s) to make decisions at runtime as to how fast an utterance is spoken and/or how long an utterance is. An indicator of the speed and/or length may then be output from the speech quality component 220 to downstream components such as a command processor 290, TTS component 314, etc. The system may then tailor its operations and/or output based on how fast the utterance was spoken and/or how long the utterance was. Examples of different models used by the speech quality component 220 to determine the one or more qualities are shown in FIG. 3 as models 353.

Figure 3:
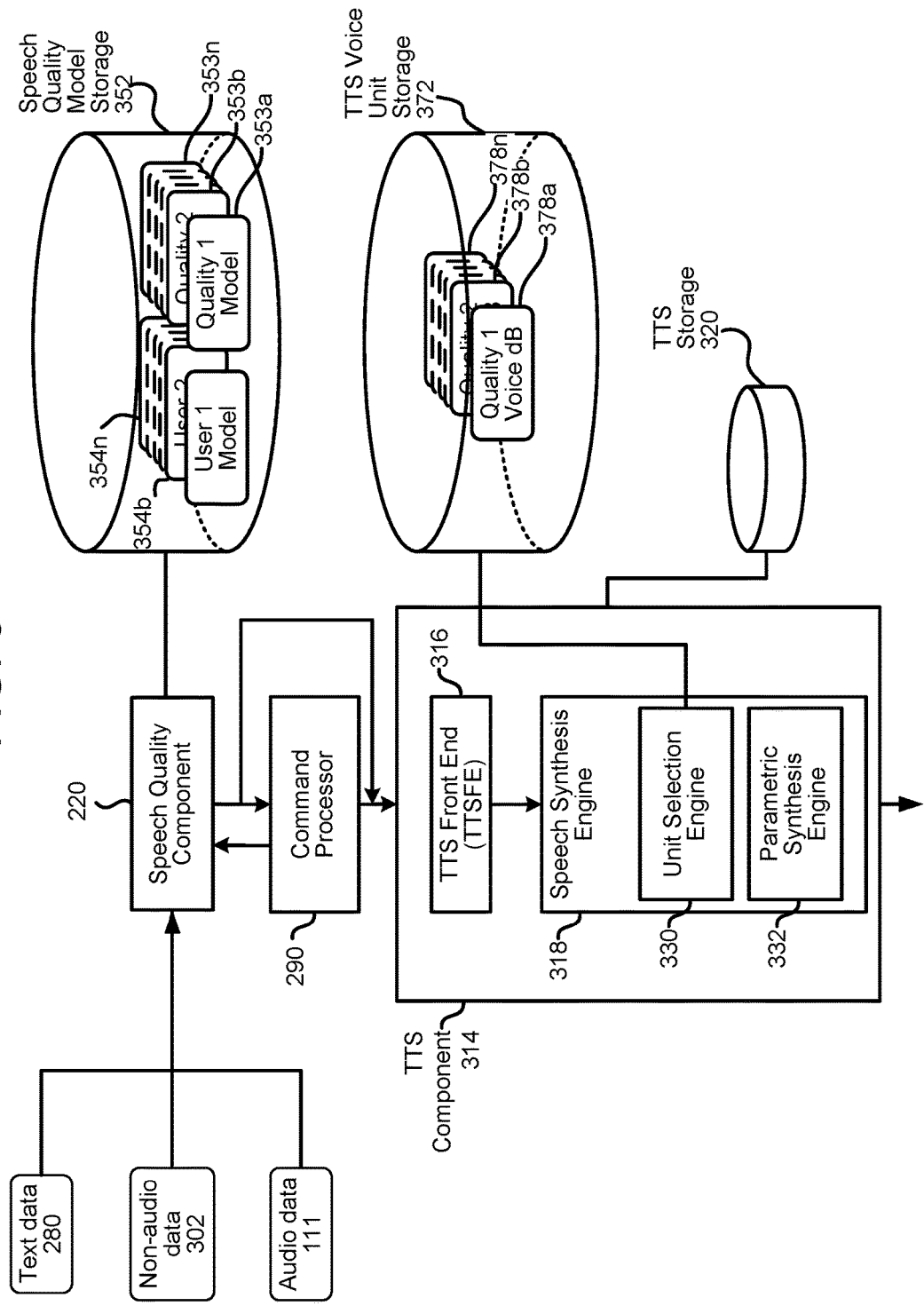
FIG. 3 is a conceptual diagram of how speech quality may be determined and used to determine a command output or text-to-speech output of a system according to embodiments of the present disclosure.

As shown in FIG. 3, the system may also employ customized models 354 that are customized for particular users. Each user may have multiple such models. The user models 354 may be used by the speech quality component 220 to determine an average speed at which the user speaks utterances and/or an average length of utterance spoken by the user. For example, the system may track a user's utterances to determine how they normally speak, or how they speak under certain conditions, and use that information to train user-specific models 354. Thus the system may determine the speech quality using some representation of a reference of how a user speaks. The user models 354 may incorporate both audio and non-audio data, which may incorporate not only how a user speaks, but how a user speaks under particular circumstances (i.e., with many individuals present, at different locations, under different lighting conditions, etc.). The user models 354 may also take into account eventual commands and/or speech output by the system so that the system may determine how user commands are processed under certain conditions. Each user model 354 may be associated with a user ID, which may be linked to a user profile containing various other information about a particular user. Such profile information may also be used to train the user model 354.

The speech quality component 220 may use the models 353, 354 to process audio data 111, text data 280 and/or non-audio data 302 (such as image data, calendar data, time data, etc.) to determine one or more speech qualities to associate with an input spoken utterance. A user may speak utterances at a specific speed or having specific lengths based on non-audio data. For example, a user may speak utterances at different speeds and/or lengths based on the time of day. In another example, a user may speak utterances at different speeds and/or lengths based on what application is operating on the device. In a further example, a user may speak utterances at different speeds and/or lengths based on the device being operated by the user (e.g., a tablet, a speech-controlled device, etc.). The speech quality component 220 may then create an indicator for the determined speech quality/ies (e.g., speed, length, etc.). The indicator may then be sent to a downstream command processor 290 so that a command/query may be processed using the indicator and based on the speech quality/ies. The command processor 290 receives the indicator, as well as text and possible other semantic notation related to the utterance, as discussed above in reference to FIG. 2. The command processor 290 may be a component capable of acting on the utterance. Examples of such components include a query processor/search engine, music player, video player, calendaring application, email/messaging application, user interaction controller, personal assistant program, etc. As can be appreciated, many types of command processors 290 are envisioned. The command processor 290 may customize its output based on the speech quality.

A TTS component of the system may be configured to synthesize output speech based on the data selected by the command processor 290 and/or based on the speech quality/utterance length associated with the input utterance. The data selected by the command processor 290 itself may be based on the speech quality/utterance length associated with the input utterance. A TTS component 314 may receive an indicator of speech quality and may configure an output speech quality based on that indication. The indication of speech quality may be based on input speech (represented by input audio data 111). For example, if a user speaks an utterance fast to a device 110, the device 110 may send audio data corresponding to the audio to a server(s) 120. The server(s) 120 may process the audio data with a speech quality component 220 to determine the utterance was spoken "fast" and to send an indicator that the speech was spoken "fast" to the TTS component 314. The server(s) 120 may perform ASR and NLU processing to identify text. The text may be sent to the TTS component 314 so the TTS component 314 may synthesize speech corresponding to the text and the indicator. Speech may be synthesized by the TTS component as described below.

The TTS component/processor 314 includes a TTS front end (TTSFE) 316, a speech synthesis engine 318, and TTS storage 320. The TTSFE 316 transforms input text data (for example from command processor 290) into a symbolic linguistic representation for processing by the speech synthesis engine 318. The TTSFE 316 may also process tags or other data input to the TTS component that indicate how specific words should be pronounced (e.g., an indication that a word is an interjection). The speech synthesis engine 318 compares the annotated phonetic units models and information stored in the TTS storage 320 for converting the input text into speech. The TTSFE 316 and speech synthesis engine 318 may include their own controller(s)/processor(s) and memory or they may use the controller/processor and memory 310 of the server 120, device 110, or other device, for example. Similarly, the instructions for operating the TTSFE 316 and speech synthesis engine 318 may be located within the TTS component 314, within the memory and/or storage of the server 120, device 110, or within an external device.

Text input into a TTS component 314 may be sent to the TTSFE 316 for processing. The front-end may include components for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 316 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS component 314 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 320. The linguistic analysis performed by the TTSFE 316 may also identify different grammatical components such as prefixes, suffixes, phrases, punctuation, syntactic boundaries, or the like. Such grammatical components may be used by the TTS component 314 to craft a natural sounding audio waveform output. The language dictionary may also include letter-to-sound rules and other tools that may be used to pronounce previously unidentified words or letter combinations that may be encountered by the TTS component 314. Generally, the more information included in the language dictionary, the higher quality the speech output.

Based on the linguistic analysis the TTSFE 316 may then perform linguistic prosody generation where the phonetic units are annotated with desired prosodic characteristics, also called acoustic features, which indicate how the desired phonetic units are to be pronounced in the eventual output speech. During this stage the TTSFE 316 may consider and incorporate any prosodic annotations that accompanied the text input to the TTS component 314. Such acoustic features may include pitch, energy, duration, and the like. Application of acoustic features may be based on prosodic models available to the TTS component 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTSFE 316, referred to as a symbolic linguistic representation, may include a sequence of phonetic units annotated with prosodic characteristics. This symbolic linguistic representation may be sent to a speech synthesis engine 318, also known as a synthesizer, for conversion into an audio waveform of speech for output to an audio output device 204 and eventually to a user. The speech synthesis engine 318 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 330 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 332, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS component 314 may include an acoustic model, or other models, which may convert a symbolic linguistic representation into a synthetic acoustic waveform of the text input based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 316.

The parametric synthesis engine 332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 318, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Figure 4:
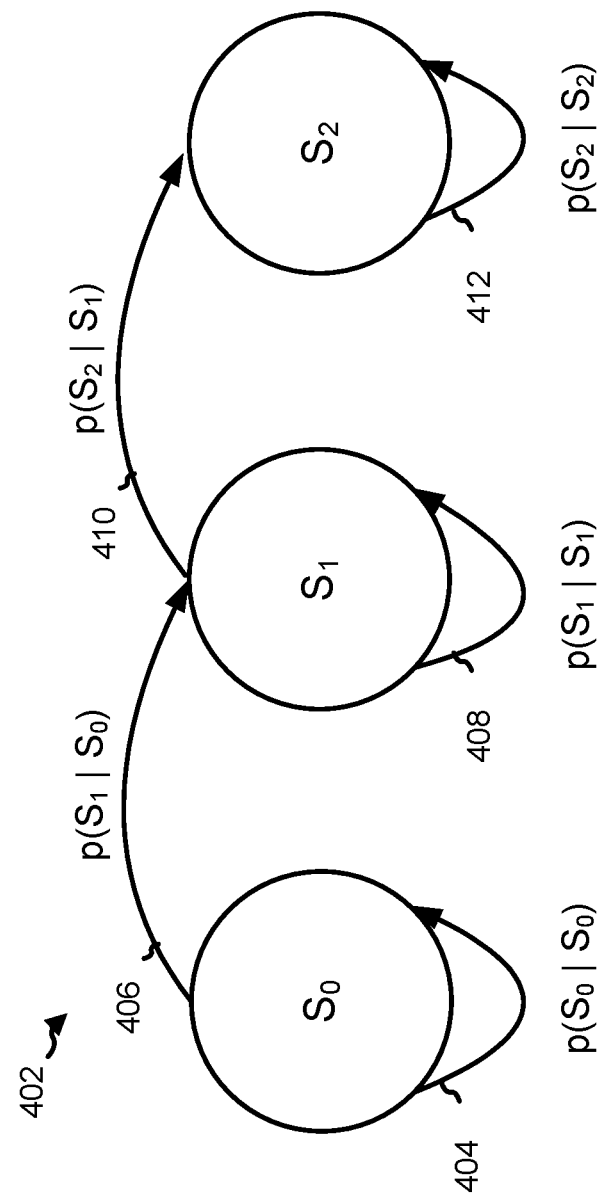
FIG. 4 illustrates speech synthesis using a Hidden Markov Model to perform text-to-speech (TTS) processing according to one aspect of the present disclosure.

An example of MINI processing for speech synthesis is shown in FIG. 4. A sample input phonetic unit, for example, phoneme /E/, may be processed by a parametric synthesis engine 332. The parametric synthesis engine 332 may initially assign a probability that the proper audio output associated with that phoneme is represented by state $S_0$ in the Hidden Markov Model illustrated in FIG. 4. After further processing, the speech synthesis engine 318 determines whether the state should either remain the same, or change to a new state. For example, whether the state should remain the same 404 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable, the calculations move to state $S_1$ and continue from there. For subsequent phonetic units, the speech synthesis engine 318 similarly determines whether the state should remain at $S_1$, using the transition probability represented by $P(S_1|S_1)$ 408, or move to the next state, using the transition probability $P(S_2|S_1)$ 410. As the processing continues, the parametric synthesis engine 332 continues calculating such probabilities including the probability 412 of remaining in state $S_2$ or the probability of moving from a state of illustrated phoneme /E/ to a state of another phoneme. After processing the phonetic units and acoustic features for state $S_2$, the speech recognition may move to the next phonetic unit in the input text.

The probabilities and states may be calculated using a number of techniques. For example, probabilities for each state may be calculated using a Gaussian model, Gaussian mixture model, or other technique based on the feature vectors and the contents of the TTS storage 320. Techniques such as maximum likelihood estimation (MLE) may be used to estimate the probability of particular states.

In addition to calculating potential states for one audio waveform as a potential match to a phonetic unit, the parametric synthesis engine 332 may also calculate potential states for other potential audio outputs (such as various ways of pronouncing phoneme /E/) as potential acoustic matches for the phonetic unit. In this manner multiple states and state transition probabilities may be calculated.

The probable states and probable state transitions calculated by the parametric synthesis engine 332 may lead to a number of potential audio output sequences. Based on the acoustic model and other potential models, the potential audio output sequences may be scored according to a confidence level of the parametric synthesis engine 332. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text.

Unit selection speech synthesis may be performed as follows. Unit selection includes a two-step process. First a unit selection engine 330 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 330. As part of unit selection, the unit selection engine 330 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 320, in storage 312, or in another storage component. For example, different unit selection databases may be stored in TTS voice unit storage 372. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 318 may attempt to select a unit in the speech unit database that most closely matches the input text (including both phonetic units and prosodic annotations). Generally the larger the voice corpus/ speech unit database the better the speech synthesis may be achieved by virtue of the greater number of unit samples that may be selected to form the precise desired speech output. An example of how unit selection is performed is illustrated in FIGS. 5A and 5B.

Figure 5A:
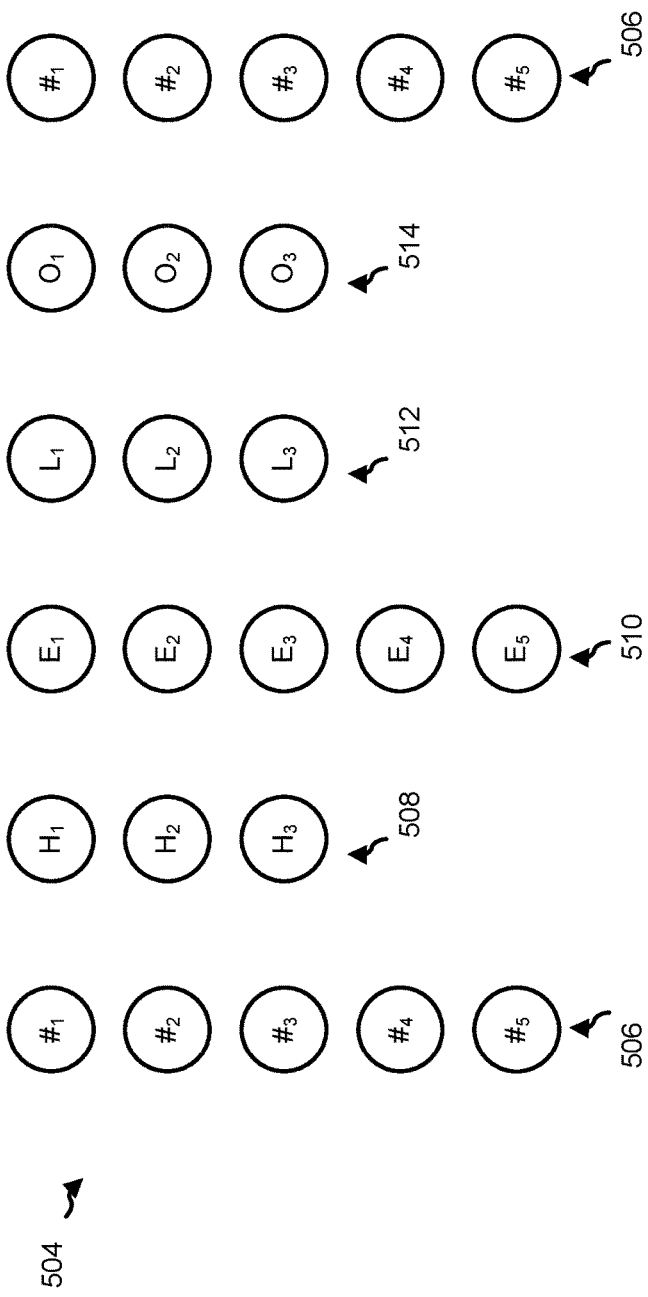

For example, as shown in FIG. 5A, a target sequence of phonetic units 502 to synthesize the word "hello" is determined by a TTS device. As illustrated, the phonetic units 502 are individual phonemes, though other units, such as diphones, etc. may be used. A number of candidate units 504 may be stored in the voice corpus. Although phonemes are illustrated in FIG. 5A, other phonetic units, such as diphones, may be selected and used for unit selection speech synthesis. For each phonetic unit there are a number of potential candidate units (represented by columns 506, 508, 510, 512 and 514) available. Each candidate unit represents a particular recording of the phonetic unit with a particular associated set of acoustic and linguistic features. The TTS system then creates a graph of potential sequences of candidate units to synthesize the available speech. The size of this graph may be variable based on certain device settings. An example of this graph is shown in FIG. 5B. A number of potential paths through the graph are illustrated by the different dotted lines connecting the candidate units. A Viterbi algorithm may be used to determine potential paths through the graph. Each path may be given a score incorporating both how well the candidate units match the target units (with a high score representing a low target cost of the candidate units) and how well the candidate units concatenate together in an eventual synthesized sequence (with a high score representing a low join cost of those respective candidate units). The TTS system may select the sequence that has the lowest overall cost (represented by a combination of target costs and join costs) or may choose a sequence based on customized functions for target cost, join cost or other factors. The candidate units along the selected path through the graph may then be combined together to form an output audio waveform representing the speech of the input text. For example, in FIG. 5B the selected path is represented by the solid line. Thus units $\#_2$, $H_1$, $E_4$, $L_3$, $O_3$, and $\#_4$ may be selected, and their respective audio concatenated, to synthesize audio for the word "hello."

Audio waveforms including the speech output from the TTS component 314 may be sent to an audio output component, such as a speaker for playback to a user or may be sent for transmission to another device, such as another server 120, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS component 314 may be configured to perform TTS processing in multiple languages. For each language, the TTS component 314 may include specially configured data, instructions and/or components to synthesize speech in the desired language(s). To improve performance, the TTS component 314 may revise/update the contents of the TTS storage 320 based on feedback of the results of TTS processing, thus enabling the TTS component 314 to improve speech recognition.

Other information may also be stored in the TTS storage 320 for use in speech recognition. The contents of the TTS storage 320 may be prepared for general TTS use or may be customized to include sounds and words that are likely to be used in a particular application. For example, for TTS processing by a global positioning system (GPS) device, the TTS storage 320 may include customized speech specific to location and navigation. In certain instances the TTS storage 320 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 318 may include specialized databases or models to account for such user preferences.

For example, to create the customized speech output of the system, the system may be configured with multiple voice corpuses/unit databases 378a-378n, where each unit database is configured with a different "voice" to match desired speech qualities. The voice selected by the TTS component 314 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 378 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile and used for speech synthesis when the specific speech quality is desired. Customized voices may be created based on multiple desired speech qualities combined (for both unit selection or parametric synthesis). For example, one voice may be "shouted" while another voice may be "shouted and emphasized." Many such combinations are possible.

As an alternative to customized voice corpuses or customized parametric "voices," one or more filters may be used to alter traditional TTS output to match the desired one or more speech qualities. For example, a TTS component 314 may synthesize speech as normal, but the system (either as part of the TTS component 314 or otherwise) may apply a filter to make the synthesized speech sound take on the desired speech quality. In this manner a traditional TTS output may be altered to take on the desired speech quality.

During runtime a TTS component 314 may receive text for speech synthesis along with an indicator for a desired speech quality of the output speech, for example, an indicator created by speech quality component 220. The TTS component 314 may then select a voice matching the speech quality, either for unit selection or parametric synthesis, and synthesize speech using the received text and speech quality indicator.

Figure 6:
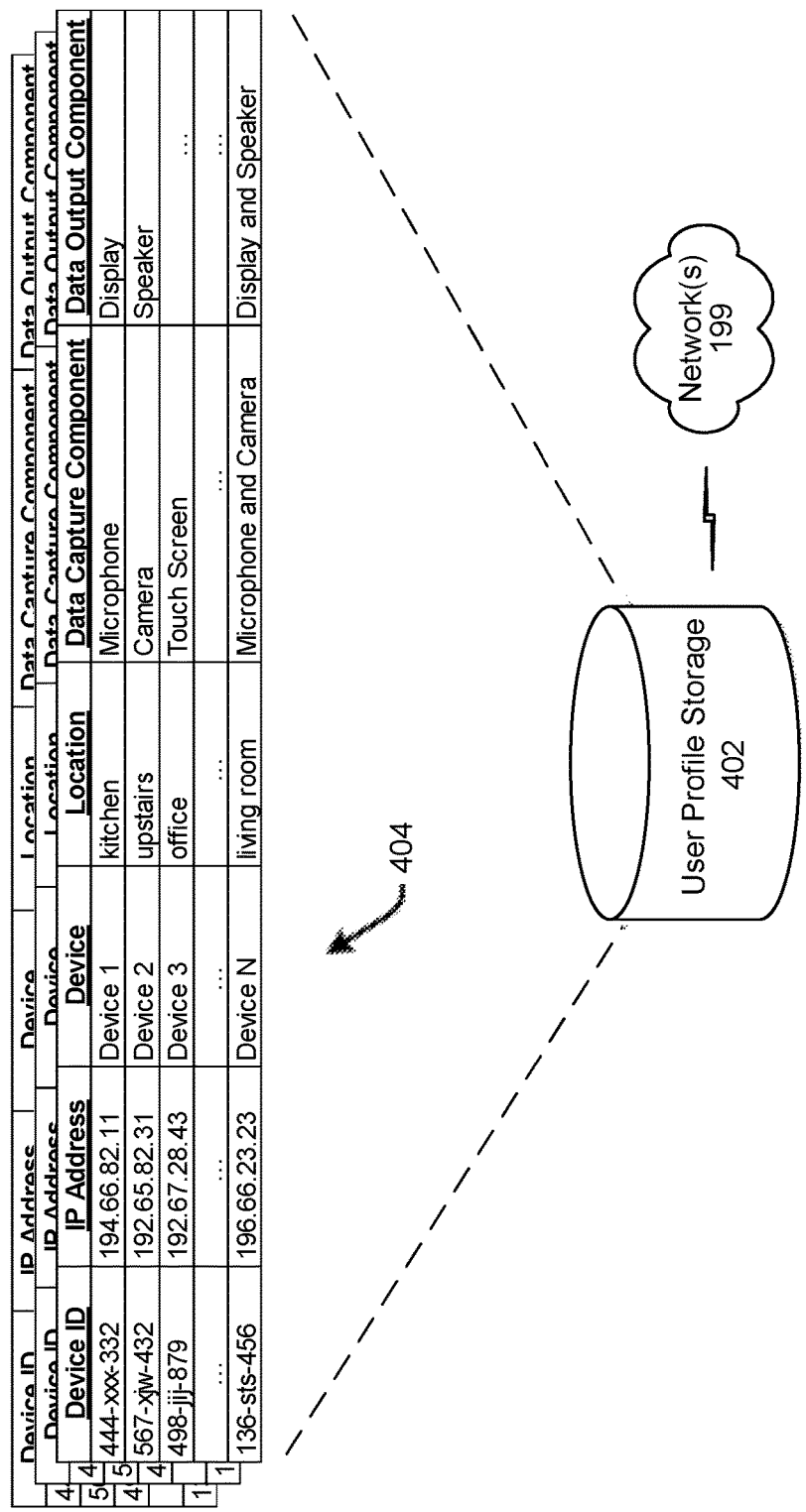
FIG. 6 illustrates data stored and associated with user profiles according to embodiments of the present disclosure.

FIG. 6 illustrates a user profile storage 602 that includes data regarding users of a device. The user profile storage 602 may be located proximate to the server(s) 120, or may otherwise be in communication with various components of the speech processing system 100, for example over the network 199. The user profile storage 602 may include a variety of information related to individual users, accounts, etc. that interact with the speech processing system 100. In an example, the user profile storage 602 is a cloud-based storage. For illustration, as shown in FIG. 6, a user's profile 604 may include data regarding various devices associated with the user. For example, device ID data, IP address data, name data, location data, data capture component data, and data output component(s) data may be associated with each respective device. Moreover, each user profile 604 may include TTS model data associated with the user. For example, a user profile 604 may include data indicating an average speed of a spoken command, an average number of words used to invoke a respective command, etc.

A user may speak utterances corresponding to commands at certain speeds (e.g., words per minute, phonemes per second, etc.). The user may speak a command at or about the user's average rate if the user intends the speech processing system 100 to output TTS content according to the speech processing system's settings. The user may speak a command faster than the user's average rate if the user intends the speech processing system 100 to output TTS content faster than its default preference. Alternatively, the user may speak a command faster than the user's average rate if the user intends the speech processing system 100 to output less TTS content than instructed under its settings.

FIG. 7 illustrates training a system to determine an average rate of speed for a particular user, for example during a training or enrollment period. The speech-controlled device 110 captures (702) input audio corresponding to a spoken utterance/command. The speech-controlled device 110 also sends (704) audio data corresponding to the spoken utterance to the server(s) 120.

The server(s) 120 determines (706) a user that spoke the utterance in the input audio data. Voice identification, image identification, password matching, fingerprint analysis, and other techniques may be used to determine the user that spoke the utterance. For example, the server(s) 120 may compare the input audio data to training data associated with various users of the speech-controlled device 110, and therefrom determine a likelihood that each user spoke the utterance. The server(s) 120 may determine (708) a rate of speech (e.g., word per minute, phoneme per second, etc.) of the utterance in the input audio data. The server(s) 120 may also determine (710) an average rate of speech of the user based on the rate of speech in the input audio data and previously stored rates of speech of the user. The previously stored rates of speech may be stored in a profile associated with the user. Determining the average rate of speech may include summing all the rates of speech of the user, and dividing the summed rate by the number of rates of speech used. The server(s) 120 may then store (712) the average rate of speech in the profile associated with the user. Steps 702 through 712 may be performed multiple times over various periods of time (illustrated by the dashed line in FIG. 7). Various processes described with respect to FIG. 7 may be performed by the speech quality component 220.

FIGS. 8A through 8B illustrate dynamically selecting TTS output based on a rate of speech of a spoken command. During runtime operations, the speech-controlled device 110 captures (814) input audio corresponding to an utterance, and sends (816 illustrated in FIG. 8A) audio data corresponding thereto to the server(s) 120. The server(s) 120 determines (818) output content responsive to the spoken utterance. The server(s) 120 may perform ASR on the input audio data to determine input text data, and may perform NLU on the input text data to determine a spoken command of the spoken utterance. The server(s) 120 may determine one or more content sources (e.g., application servers 125) storing or having access to output content responsive to the spoken command. The server(s) 120 may send (820) a signal to the application server(s) 125. The signal may include data specific to the spoken command, as well as data requesting output text data responsive to the spoken command. In response, the server(s) 120 may receive (822) output text data from the application server(s) 125.

The server(s) 120 (either after receiving the output text data from the application server(s) 125, or in parallel with obtaining output text data from the application server(s) 125) may determine (824) a rate of speech of at least a portion of the input audio data (i.e., a rate of speech of the spoken command). The speech quality component 220 may determine the rate of speech of the input audio data. The rate of speech may be measured in words per minute, phonemes per second, or the like.

The server(s) 120 may also determine (826) the user that spoke the command in the input audio data. The server(s) 120 may then access a profile of the user that spoke the command, and determine (828) an average rate of speech of the user. The server(s) 120 may determine (830 illustrated in FIG. 8B) a deviation between the rate of speech of the spoken command in the input audio data and the average rate of speech of the user. The speech quality component 220 may determine the rate of speech of the input audio data, may determine the average rate of speech of the user, and may also determine the deviation.

The server(s) 120 performs TTS processing on the output text data to create (832) output audio data. Creating the output audio data may be based on the deviation between the rate of speech of the spoken command and the average rate of speech of the user. If the deviation is below a threshold (i.e., if the rate of speech in the input audio data is substantially similar to the average rate of speech of the user), the server(s) 120 may create the output audio data using settings (e.g., creating default portions of the output audio data specific to the command and/or creating the output audio data to be output at a default speed). If the deviation is above the threshold (i.e., the rate of speech in the input audio data is above the average rate of speech of the user by at least a threshold speed), the server(s) 120 may create the output audio data to have less portions than under default conditions and/or may create the output audio data to be output at a speed faster than under default conditions.

The server(s) 120 may send (834) the output audio data to the speech-controlled device 110 and/or another device indicated in the profile of the user. The device receiving the output audio data may output (836) audio corresponding thereto.

A user may speak a command using a certain number of words. The user may speak the command using the same or about the number of words if the user intends the speech processing system 100 to output TTS content according to the speech processing system's settings. For example, the user may say "what is the weather like outside" if the user intends for the speech processing system 100 to output default portions of TTS content (e.g., a preface portion, a high temperature portion, and a low temperature portion, such as "today the temperature will have a high of 70 and a low of 60"). The user may speak the command using less words than the user's average number of words if the user intends the speech processing system 100 to output TTS content faster than its default preference. Alternatively, the user may speak the command using less words than the user's average number of words if the user intends the speech processing system 100 to output less TTS content than instructed under its settings. According to the above example, the user may say "what's today's weather" if the user intends the speech processing system 100 to output TTS content with less portions (e.g., "high 70, low 60") or at a faster rate.

Figure 9:
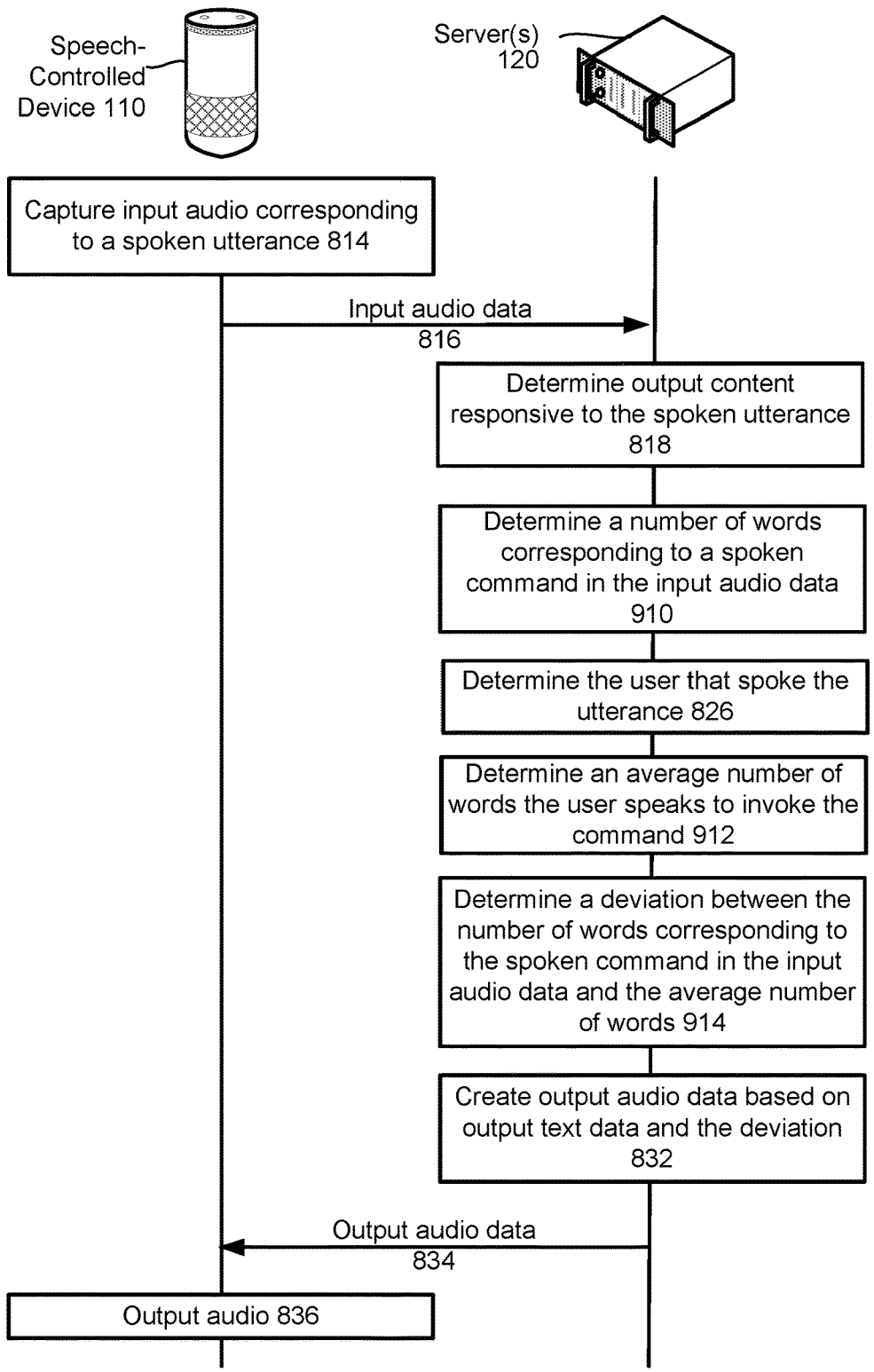
FIG. 9 is a signal flow diagram illustrating dynamically selecting TTS output based on a number of words spoken by a user to invoke a command according to embodiments of the present disclosure.

FIG. 9 illustrates dynamically selecting TTS output based on a number of words spoken by a user to invoke a command. The system 100 may be trained to determine an average number of words a user speaks to invoke a command using some or all of the techniques discussed with respect to FIG. 7. The speech-controlled device 110 captures (802) input audio corresponding to a spoken utterance. The speech-controlled device 110 also sends (804) audio data corresponding thereto to the server(s) 120.

During runtime operations, the speech-controlled device 110 captures (814) input audio corresponding to an utterance, and sends (816) audio data corresponding thereto to the server(s) 120. The server(s) 120 determines (818) output content responsive to the spoken utterance. The server(s) 120 may determine a storage, associated with the server(s) 120, that stores the output content.

The server(s) 120 may determine (9109) a number of words corresponding to a spoken command in the input audio data. The server(s) 120 may also determine (826) the user that spoke the command in the input audio data. The server(s) 120 may then access a profile of the user that spoke the command, and determine (912) an average number of words the user speaks to invoke the command. The server(s) 120 may determine (914) a deviation between the number of words of the spoken command in the input audio data and the average number of words spoken by the user to invoke the command. The speech quality component 220 (or another device linked to the user profile) may determine the number of words corresponding to the spoken command, may determine the average number of words the user speaks to invoke the command, and may also determine the deviation.

The server(s) 120 performs TTS processing on output text data to create (832) output audio data. The output text data may be received from a command processor(s) 290 or an application server(s) 125 (e.g., a weather service, time service, news service, etc.). Creating the output audio data may be based on the deviation between the number of words of the presently spoken command and the average number of words used to invoke the command. If the deviation is below a threshold (i.e., if the number of words of the presently spoken command is substantially similar to the average number of words used by the user to invoke the command), the server(s) 120 may create the output audio data using settings (e.g., creating default portions of the output audio data specific to the command and/or creating the output audio data to be output at a default speed). If the deviation is above the threshold (i.e., the number of words of the presently spoken command is below the average number of words by at least a threshold number), the server(s) 120 may create the output audio data to have less portions than under default conditions and/or may create the output audio data to be output at a speed faster than under default conditions.

The server(s) 120 may send (834) the output audio data to the speech-controlled device 110 and/or another device indicated in the profile of the user. The device receiving the output audio data may output (836) audio corresponding thereto.

A user may speak a command at a point in time. The user may have a meeting or other obligation that starts shortly after the user spoke the command. Commencement of the meeting or other obligation may begin prior to the speech processing system 100 being able to output an entirety of TTS audio responsive to the spoken command. In this situation, the speech processing system 100 may output TTS audio faster than its default preference so an entirety of the TTS audio can be output prior to commencement of the meeting. Alternatively, the speech processing system 100 may omit one or more portions of the TTS audio so the TTS audio can be output prior to commencements of the meeting.

FIGS. 10A and 10B illustrate dynamically selecting TTS output based on data of a user's electronic calendar. For example, a user may ask for traffic information. The system may determine the electronic calendar indicates a meeting in an hour at a specific location. The system may also determine it takes 50 minutes to drive to the location. Based on this, the system may output the traffic information at an accelerated rate to the user to ensure the user receives all the information quickly. The speech-controlled device 110 captures (814) input audio corresponding to a spoken utterance and sends (816) input audio data corresponding thereto to the server(s) 120.

The server(s) 120 may determine (818) output content (e.g., text data) responsive to the spoken utterance in the input audio data. The server(s) 120 also determines (826) a user that spoke the utterance. Knowing the user, the server(s) 120 may determine (1004) a calendar application server indicated in a profile associated with the user. The server(s) 120 may send (1006) a signal to the determined application server 125. The signal may include data indicating the user, and a request for calendar data specific to the user for a threshold amount of time. For example, the request may only solicit calendar data for the next two (2) minutes. This allows the server(s) 120 to receive adequate calendar data for processing as described below, without providing the server(s) 120 with extraneous data that will not affect creation of TTS audio data. For example, it would be unbeneficial for the server(s) 120 to receive a week's worth of calendar data because TTS audio data responsive to the spoken command may be output within seconds or minutes of receiving the spoken command from the speech-processing device 110.

The server(s) 120 receives (1008) calendar data from the application server 125. The server(s) 120 may determine (1010 illustrated in FIG. 10B) the calendar data indicates the user will be busy prior to TTS audio responsive to the spoken command being completely output according to settings of the speech processing system 100. The server(s) 120 performs TTS processing on the determined output text data, and creates (1012) output audio data based on the calendar data. If the calendar data indicates the user will be busy prior to an entirety of the TTS audio data being output according to settings of the speech processing system 100, the server(s) 120 may create the output audio data to have less portions than under default conditions and/or may create the output audio data to be output at a speed faster than under default conditions such that, in any event, the TTS audio data may be completely output prior to the user becoming busy.

The server(s) 120 may send (834) the output audio data to the speech-controlled device 110 and/or another device indicated in the profile of the user. The device receiving the output audio data may output (836) audio corresponding thereto.

A user may speak utterances corresponding to commands using certain inflections and other speech characteristics (e.g., pitch, tone, etc.). The user may speak a command using the same or substantially similar pitch, tone, or the like if the user intends the speech processing system 100 to output TTS content according to the speech processing system's settings. The user may speak a command using a different pitch, tone, or the like if the user intends the speech processing system 100 to omit one or more portions from TTS audio data created using settings and/or output TTS audio data at a rate faster than a default rate. For example, if the user speaks a command with a higher pitch than usual, the user may be in a hurry and intend the speech processing system 100 to alter its default TTS output. The speech processing system 100 may only alter its TTS output if the speech characteristics of a presently spoken command are different from the user's average speech characteristics by a certain threshold. This allows the speech processing system 100 to ensure it does not alter its TTS output in situations where the user uses different speech characteristics but does not intend the speech processing system 100 to alter its default TTS output. One example of this includes a user using different speech characteristics when the user is sick, but the user is not in a hurry and does not intend the speech processing system 100 to alter its default TTS output.

Figure 11:
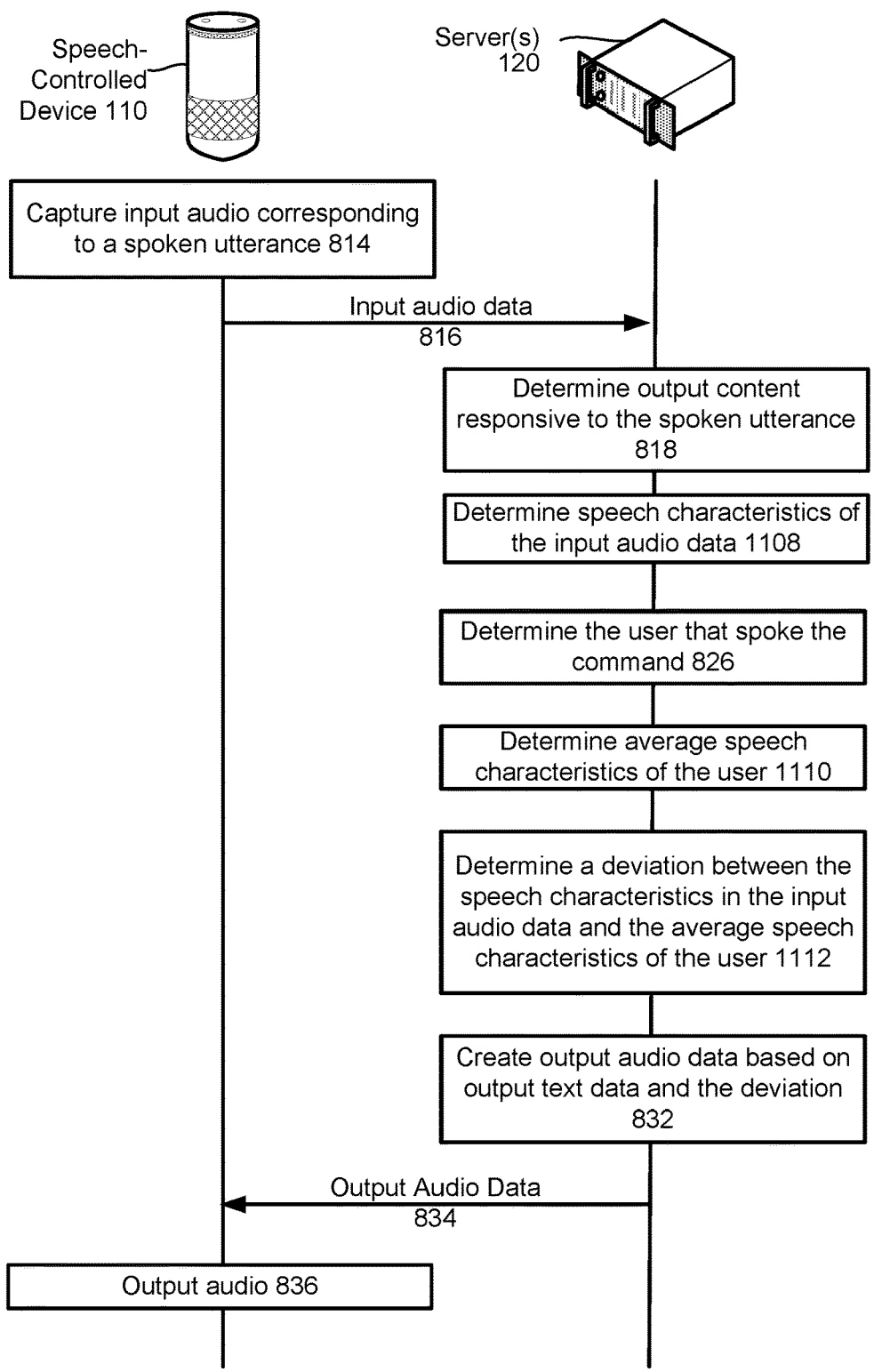
FIG. 11 is a signal flow diagram illustrating dynamically selecting TTS output based on speech characteristics according to embodiments of the present disclosure.

FIG. 11 illustrates dynamically selecting TTS output based on speech characteristics (e.g., pitch, tone, etc.). The system 100 may be trained to determine average speech characteristics of a user using some or all of the techniques discussed with respect to FIG. 7. The speech-controlled device 110 captures (802) input audio corresponding to a spoken utterance and sends (804) audio data corresponding thereto to the server(s) 120.

The speech-controlled device 110 captures (814) input audio corresponding to an utterance, and sends (816) audio data corresponding thereto to the server(s) 120. The server(s) 120 determines (818) output content (i.e., output text data) responsive to the spoken utterance. The server(s) 120 may determine (1108) speech characteristics of at least a portion of the input audio data (e.g., speech characteristics of a spoken command portion of the input audio data). The server(s) 120 may also determine (82611) the user that spoke the command in the input audio data. The server(s) 120 may then access a profile of the user that spoke the command, and determine (1110) average speech characteristics of the user. The server(s) 120 may determine (1112) a deviation between the speech characteristics of the spoken command in the input audio data and the average speech characteristics of the user. The speech quality component 220 may determine the speech characteristics in the input audio data, may determine the average speech characteristics of the user, and may also determine the deviation.

The server(s) 120 performs TTS processing on the output text data to create (832) output audio data. Creating the output audio data may be based on the deviation between the speech characteristics of the spoken command and the average speech characteristics of the user. If the deviation is below a threshold (i.e., if the speech characteristics in the input audio data are substantially similar to the average speech characteristics of the user), the server(s) 120 may create the output audio data using settings (e.g., creating default portions of the output audio data specific to the command and/or creating the output audio data to be output at a default speed). If the deviation is above the threshold (i.e., the speech characteristics in the input audio data is different from the average speech characteristics of the user by at least the threshold), the server(s) 120 may create the output audio data to have less portions than under default conditions and/or may create the output audio data to be output at a speed faster than under default conditions.

The server(s) 120 may send (834) the output audio data to the speech-controlled device 110 and/or another device indicated in the profile of the user. The device receiving the output audio data may output (836) audio corresponding thereto.

A user may speak multiple commands to a speech-processing device 110 over time. In some situations, the user may speak multiple commands to the speech-processing device 110 in a rather short duration of time. This may indicate to the speech processing system 100 that the user intends to have less TTS audio data output in response to each spoken command and/or the TTS audio data should be output at a quicker pace that under settings of the speech processing system 100.

Figure 12:
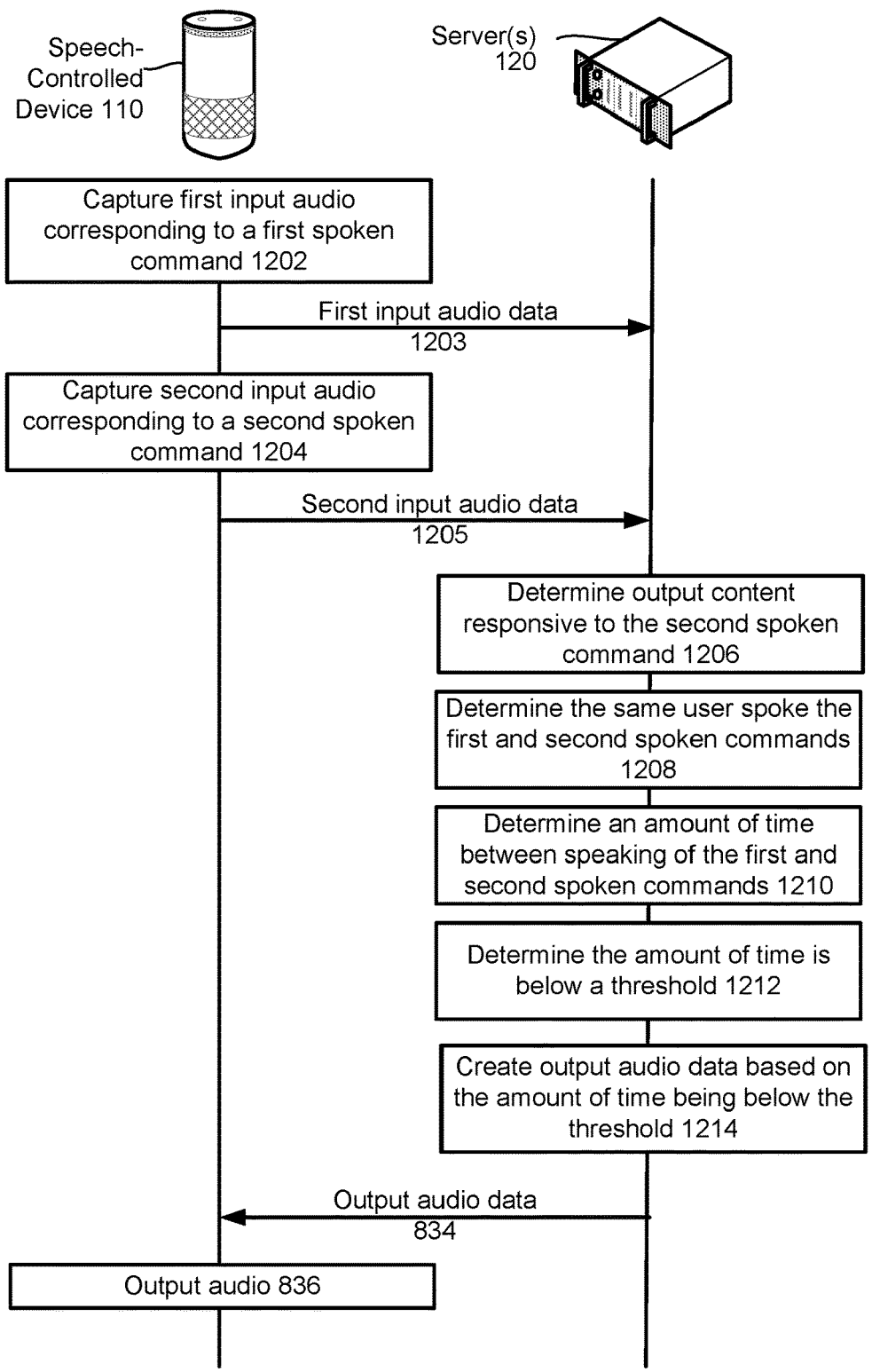
FIG. 12 is a signal flow diagram illustrating dynamically selecting TTS output based on a duration of time between spoken commands according to embodiments of the present disclosure.

FIG. 12 illustrates dynamically selecting TTS output based on a duration of time between spoken commands. The speech-controlled device 110 captures (1202) input audio corresponding to a spoken command and sends (1203) audio data corresponding thereto to the server(s) 120. Sometime thereafter, the speech-controlled device 110 captures (1204) input audio corresponding to a subsequently spoken command, and sends (1205) audio data corresponding thereto to the server(s) 120.

The server(s) 120 determines (1206) output content (i.e., output text data) responsive to the subsequently spoken command. The server(s) 120 may determine (1208) a single user spoke both the original command and the subsequent command. The server(s) 120 may also determine (1210) an amount/a duration of time between speaking of the original command and speaking of the subsequent command. The server(s) 120 may further determine (1212) the amount/duration is below a threshold amount/duration of time. A profile of the user may include data representing an average amount of time between when the user speaks commands. This average amount of time may be the threshold used to determine whether the amount of time is below a threshold.

The server(s) 120 performs TTS processing on the output text data to create (1214) output audio data based on the amount/duration of time being below the threshold. If the amount/duration of time is below the threshold (i.e., if the user speaks the two commands in succession in less time than usually speaking two consecutive commands), the server(s) 120 may create the output audio data to have less portions than under default conditions and/or may create the output audio data to be output at a speed faster than under default conditions.

The server(s) 120 may send (834) the output audio data to the speech-controlled device 110 and/or another device indicated in the profile of the user. The device receiving the output audio data may output (836) audio corresponding thereto.

As described herein above, the server(s) 120 may receive output content (i.e., output text data) irrespective of how TTS audio data will be configured. In at least some situations, it may be beneficial for the server(s) 120 to first determine a format/template for dynamically outputting content, and thereafter receive content in the form of the template. For example, a first weather template may correspond to "The weather [date_day_ID] is [current_weather_condition] and [current_temp_value] with a high of [high_temp_value] and a low of [low_temp_value]", whereas a second shorter weather template may correspond to "It is [current_weather_condition] and [current_temp_value]". By using a template based approach, the server(s) 120 is able to simply generate output template text data once, and populate the template with appropriate data in any given circumstance.

Figure 13:
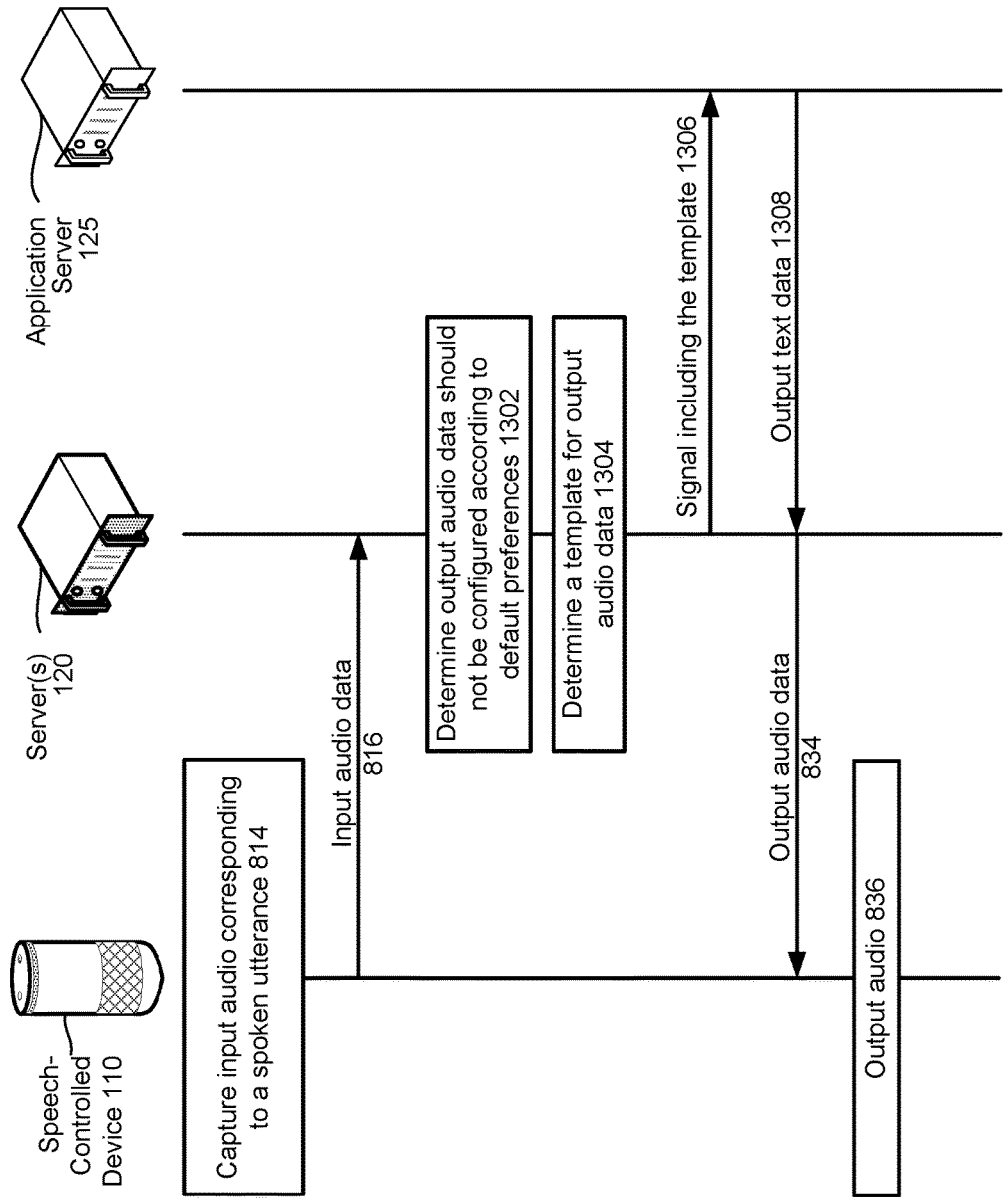
FIG. 13 is a signal flow diagram illustrating receiving output content according to a dynamically configured output content template according to embodiments of the present disclosure.

FIG. 13 illustrates receiving output content according to a dynamically configured output content template. The speech-controlled device 110 captures (814) input audio corresponding to a spoken utterance, and sends (816) input audio data corresponding thereto to the server(s) 120.

The server(s) 120 determines (1302) output audio data should not be configured according to settings of the speech processing system 100. Such may be determined based on the teachings herein above, and others. The server(s) 120 may determine (1304) a template indicating portions of output audio data to be output and/or a speed at which the output audio data should be output.

The server(s) 120 sends (1306) a signal including the template to an application server 125 storing or having access to audio data responsive to the spoken utterance. The application server 125 generates output text data according to the template, and sends (1308) the output text data to the server(s) 120. The server(s) 120 may then send (834) the output audio data to the speech-controlled device 110 and/or another device indicated in a profile of the user. The device receiving the output audio data may output (836) audio corresponding thereto. Alternatively, the application server 125 may communicate the output audio data to the speech-controlled device 110 without use of the server(s) 120. The speech quality component 220 may determine the output audio data should not be configured according to settings of the speech processing system 100, and may also determine the template for the output audio data.

In a further example, the server(s) 120 may determine (1304) the template, and therefrom determine needed data to populate the template. The server(s) 120 may then send a signal indicated the needed data to the application server(s) 125. The server(s) 120 may receive the needed data from the application server(s) 125, populate the template with the received data, and perform TTS on the populated template text data to generate output audio data.

Figure 14:
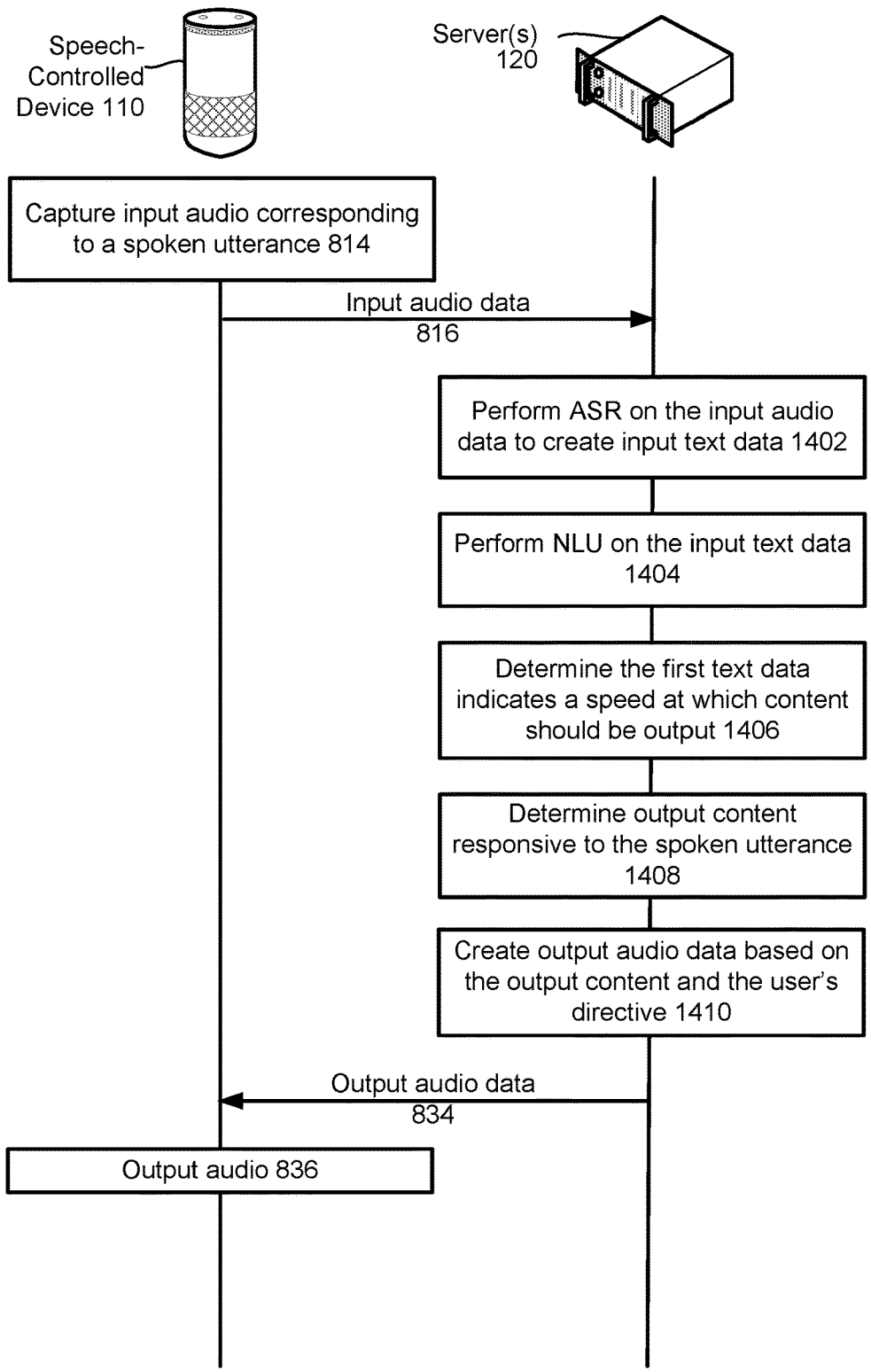
FIG. 14 is a signal flow diagram illustrating a user directing dynamic configuration of output content according to embodiments of the present disclosure.

Instead of relying on the speech processing system 100 to determine whether to dynamically alter output audio data, the user may direct the speech processing system 100 to do so. FIG. 14 illustrates a user directing dynamic configuration of output content. The speech-controlled device 110 captures (814) input audio corresponding to a spoken utterance, and sends (816) audio data corresponding thereto to the server(s) 120.

The server(s) 120 performs speech processing on the input audio data. The server(s) 120 may perform (1402) ASR on the input audio data to create input text data, and may perform (1404) NLU on the input text data. The server(s) 120 may determine (1406), based on the NLU results, the input text data indicates a speed at which content should be output to the user. The speech quality component 220 may determine the input text data indicates the speed at which the content should be output. For example, the input text data may include text corresponding to "what is the weather, at half speed" or "quickly tell me the weather". The server(s) 120 may determine (1408) output content responsive to a command portion of the spoken utterance. The server(s) 120 creates (1410) output audio data based on the output content and the speed directive contained in the input text data.

The server(s) 120 may send (834) the output audio data to the speech-controlled device 110 and/or another device indicated in the profile of the user. The device receiving the output audio data may output (836) audio corresponding thereto.

Figure 15:
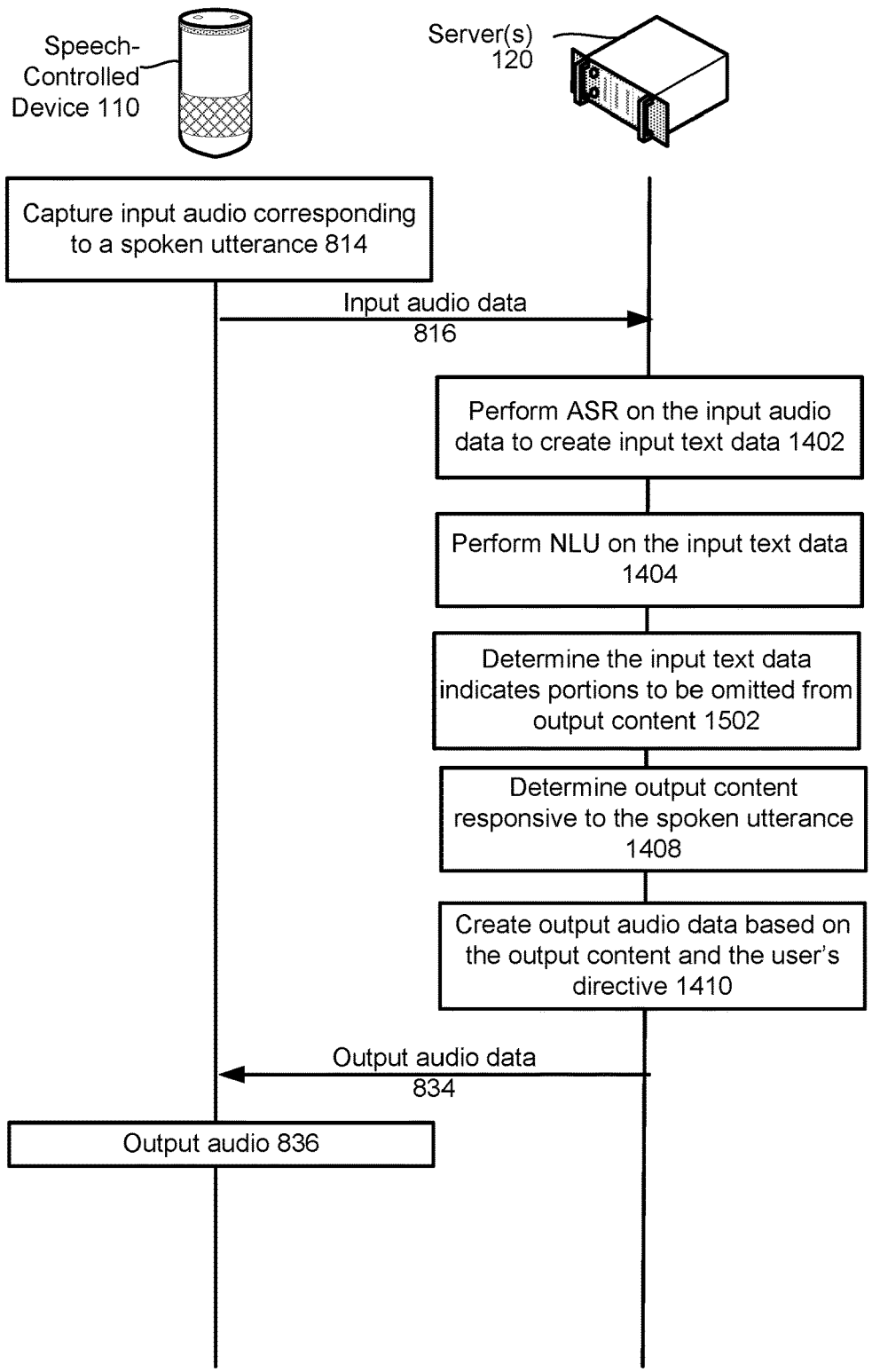
FIG. 15 is a signal flow diagram illustrating a user directing dynamic configuration of output content according to embodiments of the present disclosure.

FIG. 15 further illustrates a user directing dynamic configuration of output content. The speech-controlled device 110 captures (814) input audio corresponding to a spoken utterance, and sends (816) audio data corresponding thereto to the server(s) 120.

The server(s) 120 performs speech processing on the input audio data. The server(s) 120 may perform (1402) ASR on the input audio data to create input text data, and may perform (1404) NLU on the input text data. The server(s) 120 may determine (1502), based on the NLU results, the input text data indicates portions of content that should not be output to the user. For example, the input text data may include text corresponding to "what is the weather, only high temperature". The server(s) 120 may determine (1408) output content responsive to a command portion of the spoken utterance. The server(s) 120 creates (1410) output audio data based on the output content and the directive contained in the input text data.

The server(s) 120 may send (834) the output audio data to the speech-controlled device 110 and/or another device indicated in the profile of the user. The device receiving the output audio data may output (836) audio corresponding thereto.

Figure 16A:
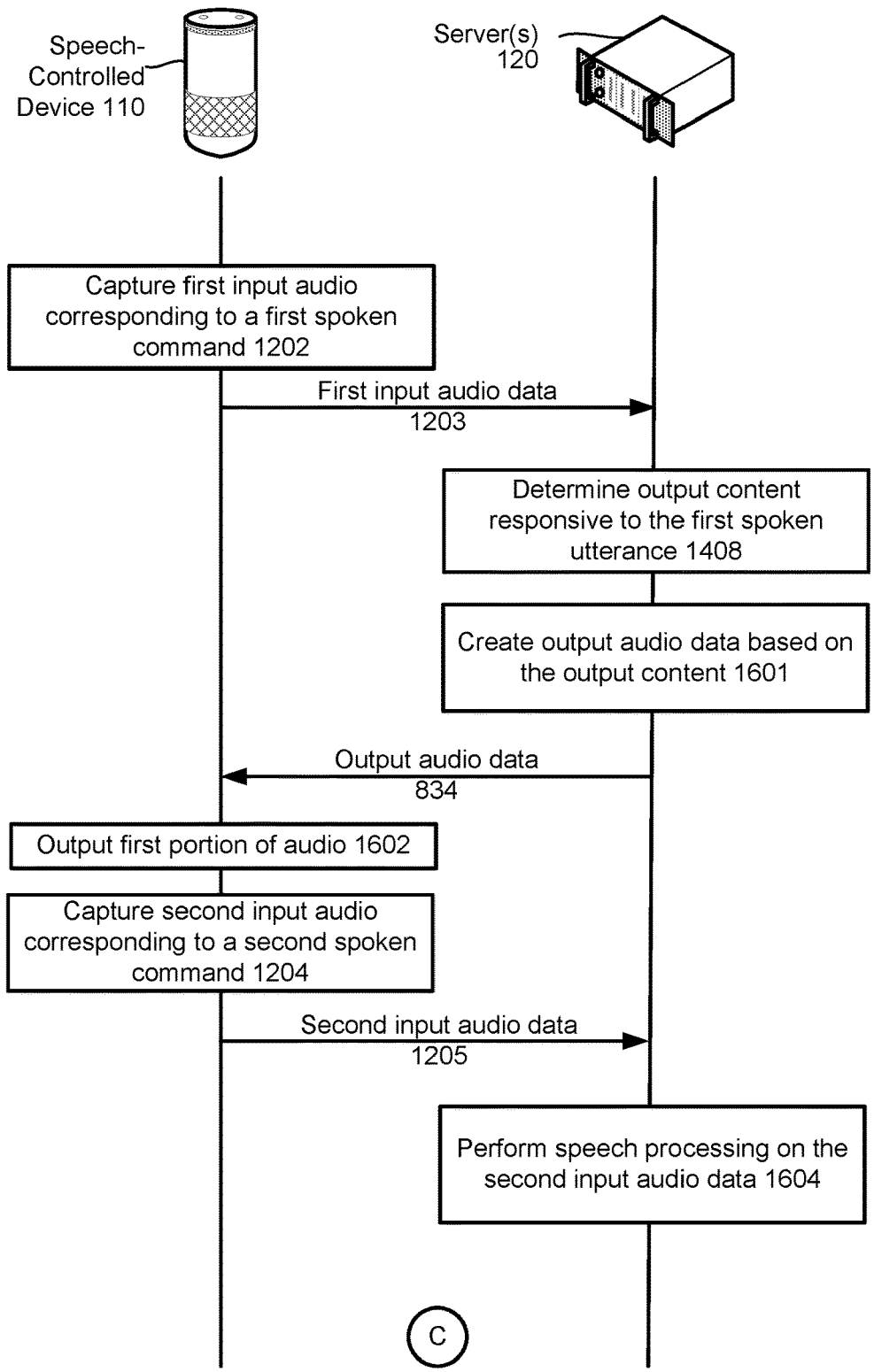
FIGS. 16A and 16B are a signal flow diagram illustrating a user directing dynamic configuration of output content according to embodiments of the present disclosure.
Figure 16B:
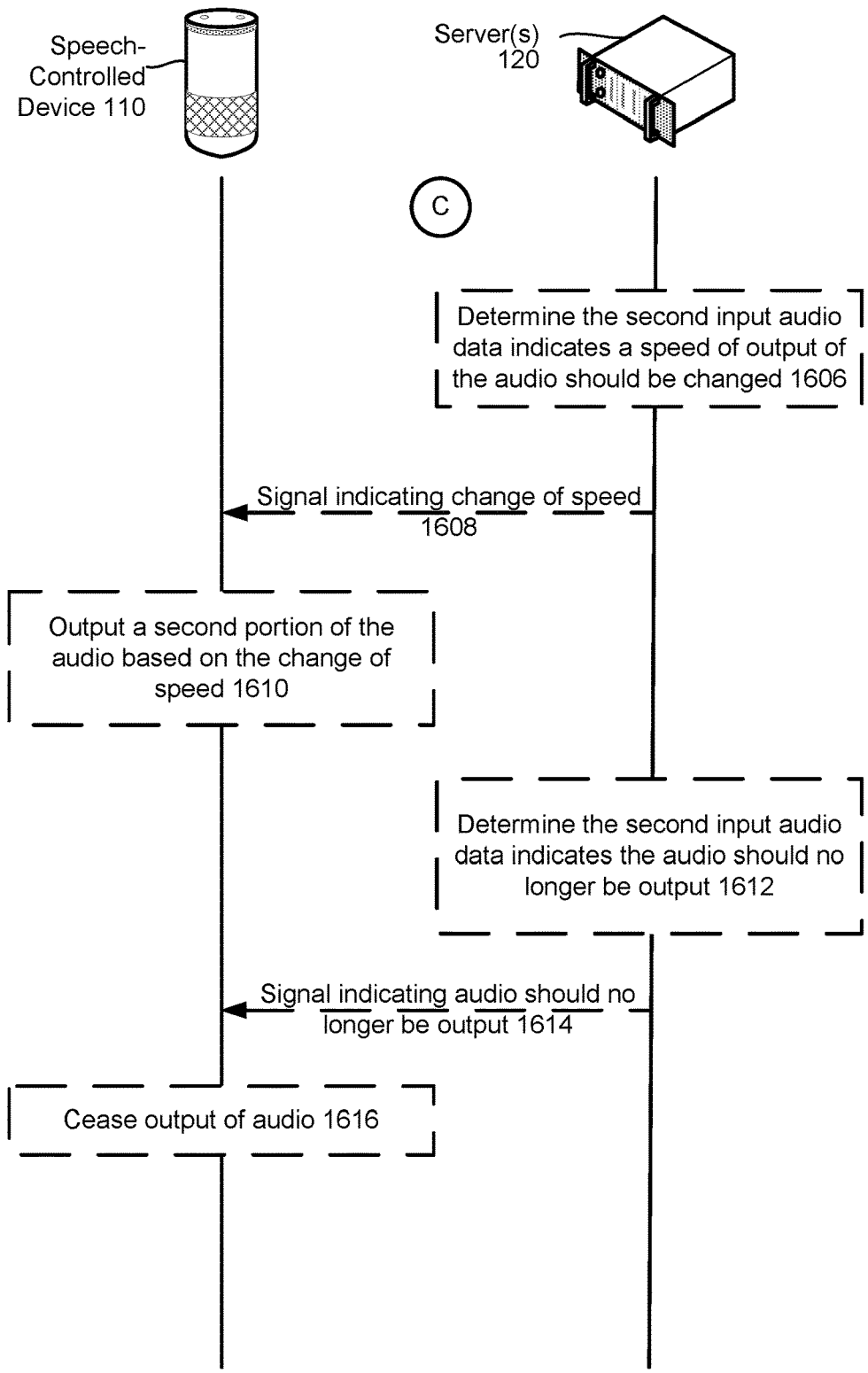

A user may speak a command and the speech-controlled device 110 may output responsive audio thereto. While the speech-controlled device 110 is outputting the audio, the user may speak a directive to alter output of the audio. The speech processing system 100 may process the spoken directive and cause the speech-controlled device 110 to alter output of audio as it is being output. FIGS. 16A and 16B illustrate a user directing dynamic configuration of output content as audio is being output by the speech-controlled device 110. The speech-controlled device 110 captures (1202) input audio corresponding to a spoken utterance, and sends (1203) audio data corresponding thereto to the server(s) 120. The server(s) 120 determines (1408) output content responsive to the spoken utterance and creates (1601) output audio data based on the output content. The server(s) 120 sends (834) the output audio data to the speech-controlled device 110, and the speech-controlled device 110 outputs (1602) a first portion of the audio.

While the speech-controlled device 110 is outputting the first portion of the audio, the speech-controlled device 110 captures (1204) a spoken utterance, and sends (1205) audio data corresponding thereto to the server(s) 120. The server(s) 120 performs (1604) speech processing (e.g., ASR and NLU) on the input audio data.

Based on the speech processing, the server(s) 120 may determine (1606) the subsequently spoken utterance indicates a speed of outputting the audio should be changed. For example, the server(s) 120 may determine spoken utterances of "faster" or "output audio faster" to indicate the audio should be output faster. For further example, the server(s) 120 may determine spoken utterances of "slower" or "output audio slower" to indicate the audio should be output slower. The server(s) 120 sends (1608) a signal indicating how to change the output speed to the speech-controlled device 110, and the speech-controlled device 110 outputs (1610) the remaining portions of the audio according to the changed speed.

Alternatively, based on the speech processing, the server(s) 120 may determine (1612) the subsequently spoken utterance indicates the audio should no longer be output. For example, the server(s) 120 may determine spoken utterances of "cease output" or "stop output" to indicate the audio should no longer be output. The server(s) 120 sends (1614), to the speech-controlled device 110, a signal directing the speech-controlled device 110 to cease output of audio. The speech-controlled device 110 in turn ceases (1616) output of the audio.

Users in a first geographic location (e.g., the Midwest) and user in a second geographic location (e.g., New York City) may desire to have audio output at different speeds. For example, users in the Midwest may live a slower paced life than users in New York City. Therefore, the speech processing system 100 may output audio slower to the users in the Midwest, and faster to the users in New York City.

FIG. 17 illustrates dynamically selecting TTS output based on a geographic location associated with a user. The speech-controlled device 110 captures (814) audio corresponding to a spoken utterance, and sends (816) audio data corresponding thereto to the server(s) 120. The server(s) 120 determines (1408) content responsive to the spoken utterance. The server(s) 120 also determines (826) a user that spoke the utterance. The server(s) 120 may access (1702) a profile associated with the user, and may determine (1704) an address of the user indicated in the profile. The server(s) 120 may determine (1706) output audio data based on the output content and the address. The server(s) 120 may send (834) the output audio data to the speech-controlled device 110 and/or another device indicated in the profile of the user. The device receiving the output audio data may output (836) audio corresponding thereto.

Figure 18:
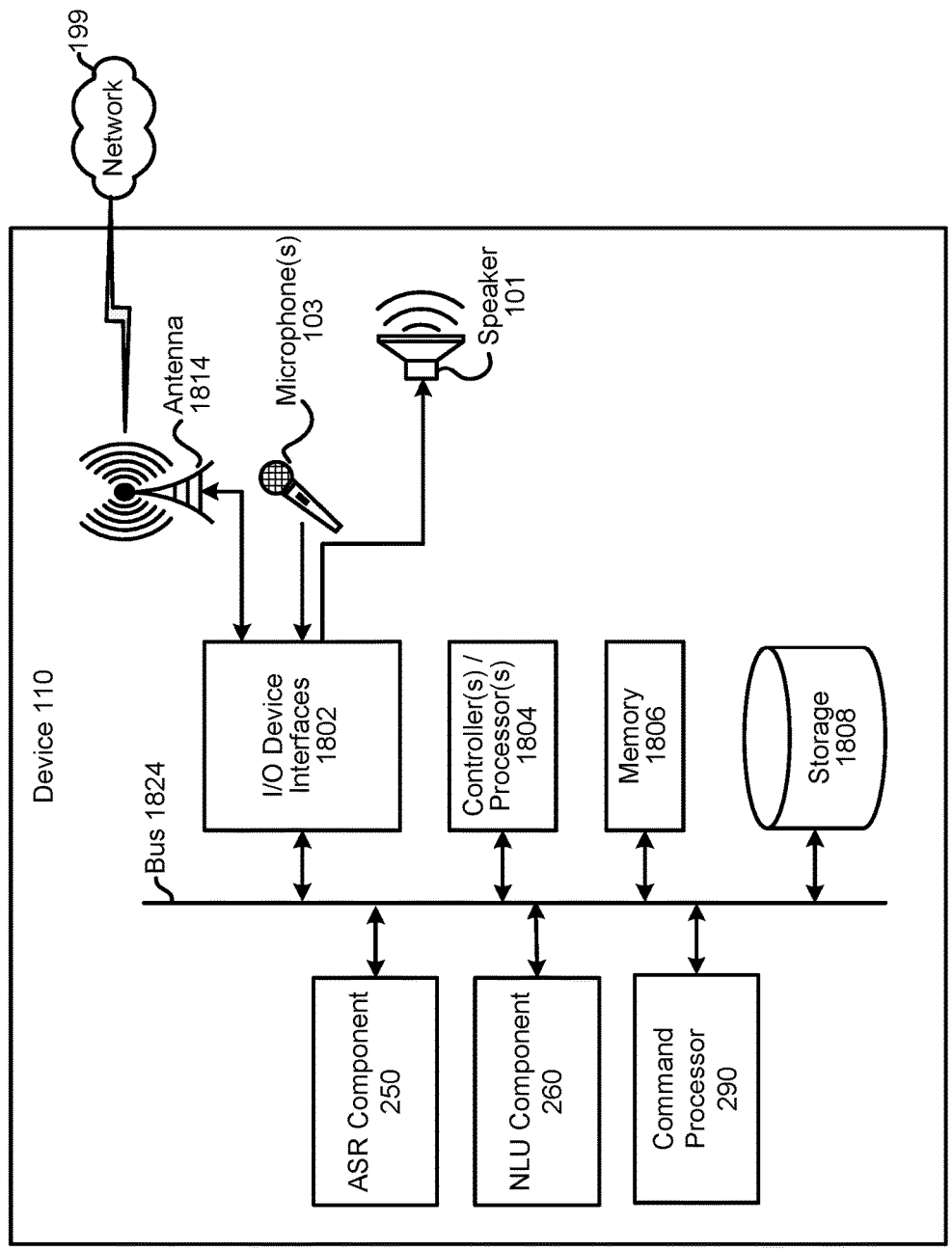
FIG. 18 is a block diagram conceptually illustrating example components of a device according to embodiments of the present disclosure.
Figure 19:
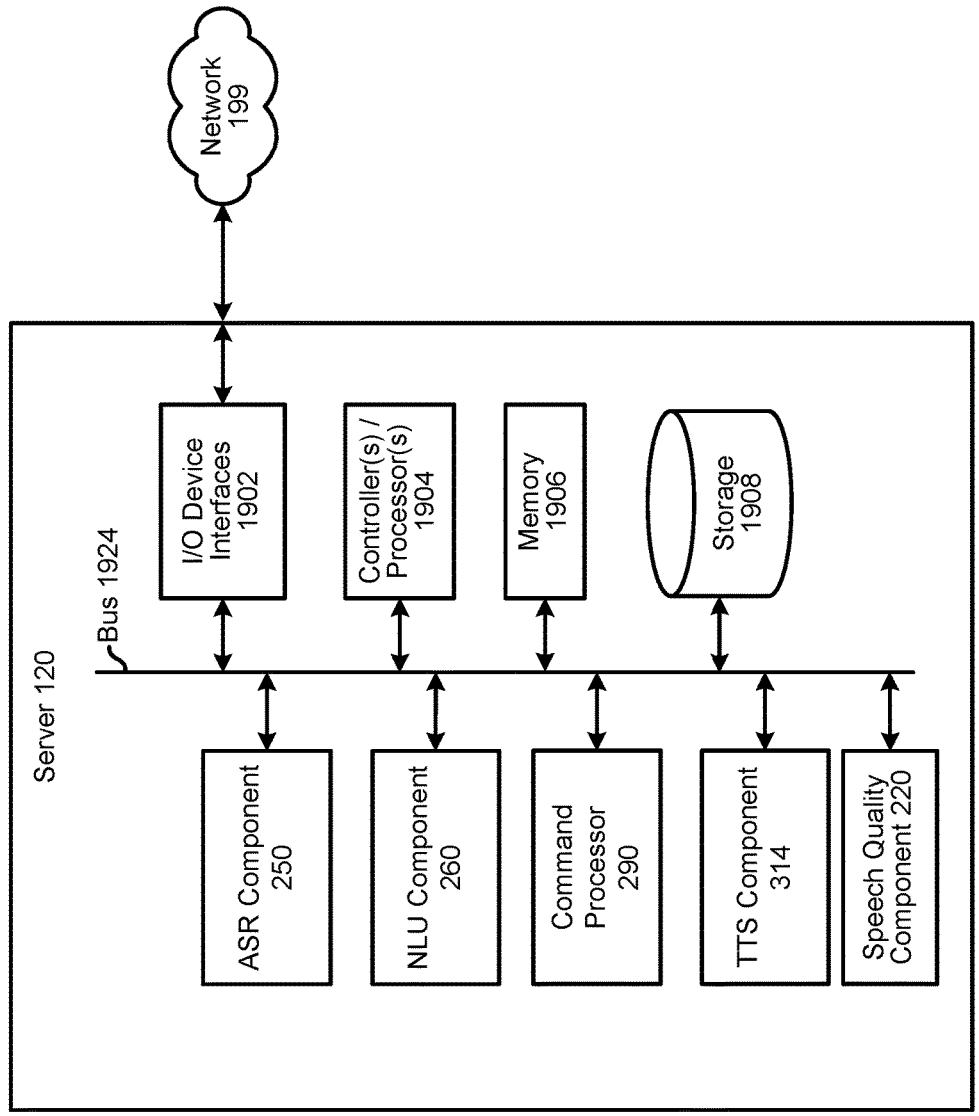
FIG. 19 is a block diagram conceptually illustrating example components of a server according to embodiments of the present disclosure.

FIG. 18 is a block diagram conceptually illustrating a user device 110 (e.g., the speech-controlled device 110 described herein) that may be used with the described system 100. FIG. 19 is a block diagram conceptually illustrating example components of a remote device, such as the server 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1804/1904), that may each include a central processing unit (CPU) for processing data and computer-readable instructions, and a memory (1806/1906) for storing data and instructions of the respective device. The memories (1806/1906) may individually include volatile random access memory (RAM), non-volatile read only memory (ROM), non-volatile magnetoresistive (MRAM) and/or other types of memory. Each device (110/120) may also include a data storage component (1808/1908), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1802/1902).

Computer instructions for operating each device (110/120) and its various components may be executed by the respective device's controller(s)/processor(s) (1804/1904), using the memory (1806/1906) as temporary "working" storage at runtime. A device's computer instructions may be stored in a non-transitory manner in non-volatile memory (1806/1906), storage (1808/1908), or an external device(s). Alternatively, some or all of the executable instructions may be embedded in hardware or firmware on the respective device in addition to or instead of software.

Each device (110/120) includes input/output device interfaces (1802/1902). A variety of components may be connected through the input/output device interfaces (1802/1902), as will be discussed further below. Additionally, each device (110/120) may include an address/data bus (1824/1924) for conveying data among components of the respective device. Each component within a device (110/120) may also be directly connected to other components in addition to (or instead of) being connected to other components across the bus (1824/1924).

Referring to FIG. 18, the device 110 may include input/output device interfaces 1802 that connect to a variety of components such as an audio output component such as a speaker 101, a wired headset or a wireless headset (not illustrated), or other component capable of outputting audio. The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array.

For example, via antenna(s) 1814, the input/output device interfaces 1802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system 100 may be distributed across a networked environment.

The device 110 and/or the server(s) 120 may include an ASR component 250. The ASR component 250 in the device 110 may be of limited or extended capabilities. The ASR component 250 may include the language models 254 stored in ASR model storage component 252. If limited speech recognition is included, the ASR component 250 may be configured to identify a limited number of words, whereas extended speech recognition may be configured to recognize a much larger range of words.

The device 110 and/or the server 120 may include a limited or extended NLU component 260. The NLU component 260 in the device 110 may be of limited or extended capabilities. The NLU component 260 may comprise the name entity recognition component 262, the intent classification component 264, and/or other components. The NLU component 260 may also include a stored knowledge base and/or entity library, or those storages may be separately located.

The device 110 and/or the server 120 may include the command processor 290 configured to execute commands/functions associated with a spoken utterance as described herein. The server(s) 120 may include the TTS component 314 configured to performs various operations described herein. The server(s) 120 may also include a speech quality component 220 used to determine qualities of the input speech for purposes of selecting/altering content for TTS output as described herein.

As noted above, multiple devices may be employed in a single speech processing system 100. In such a multi-device system, each of the devices may include different components for performing different aspects of the speech processing. The multiple devices may include overlapping components. The components of the device 110 and the server(s) 120, as illustrated in FIGS. 18 and 19, are illustrative, and may be located as a stand-alone device or may be included, in whole or in part, as a component of a larger device or system.

Figure 20:
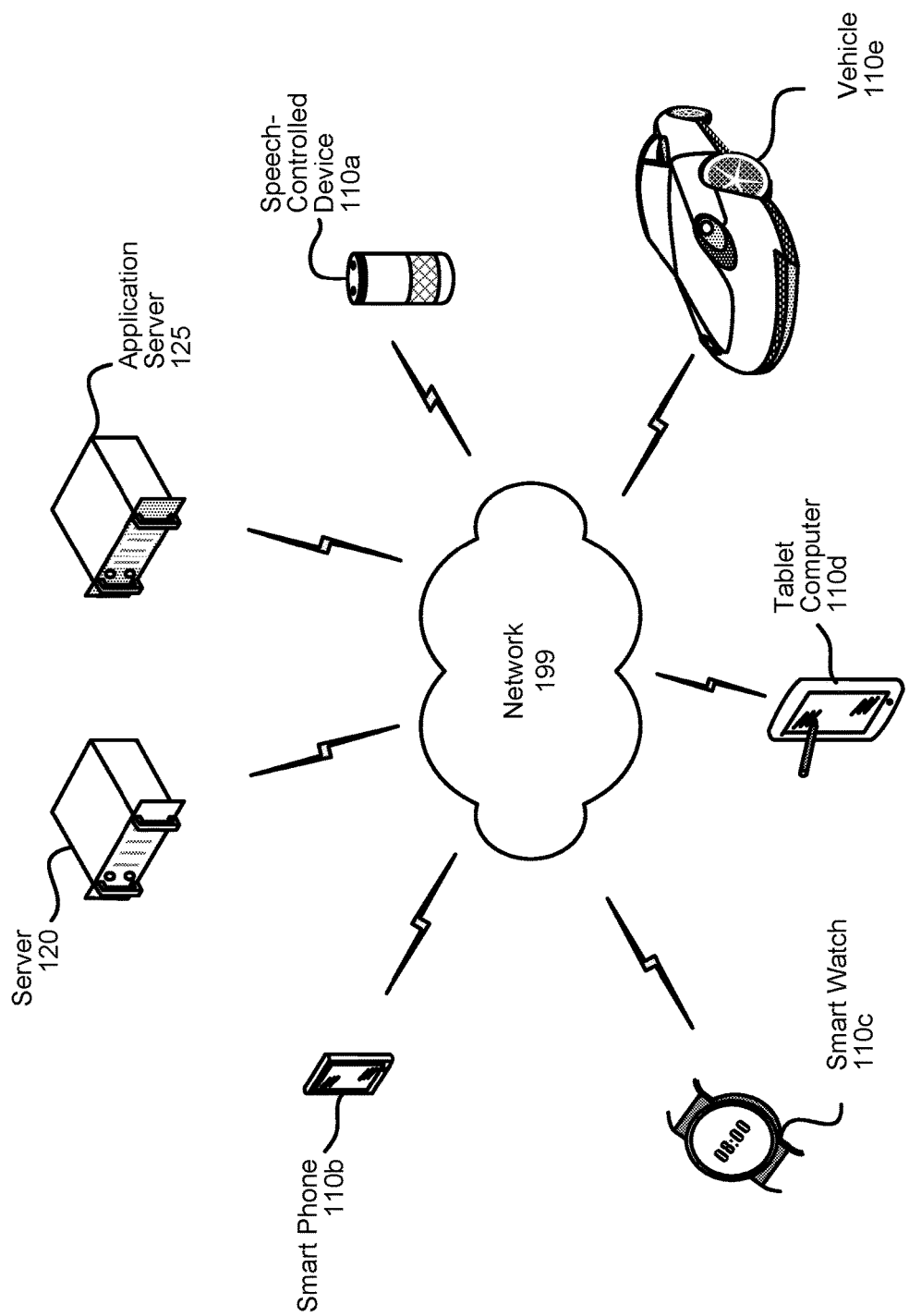
FIG. 20 illustrates an example of a computer network for use with the system.

As illustrated in FIG. 20, multiple devices (120, 125, 110a-110e) may contain components of the system 100 and the devices may be connected over a network 199. The network 199 may include a local or private network or may include a wide network such as the Internet. Devices may be connected to the network 199 through either wired or wireless connections. For example, the speech-controlled device 110a, a smart phone 110b, a smart watch 110c, a tablet computer 110d, and/or a vehicle 110e may be connected to the network 199 through a wireless service provider, over a WiFi or cellular network connection, or the like. Other devices are included as network-connected support devices, such as the server 120 or others. The support devices may connect to the network 199 through a wired connection or wireless connection. Networked devices may capture audio using one-or-more built-in or connected microphones 103 or audio capture devices, with processing performed by ASR, NLU, or other components of the same device or another device connected via the network 199, such as the ASR component 250, the NLU component 260, etc. of one or more servers 120.

The concepts disclosed herein may be applied within a number of different devices and computer systems, including, for example, general-purpose computing systems, speech processing systems, object recognition (e.g., facial recognition) systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, while still achieving the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the components and engines may be implemented as in firmware or hardware, such as the AFE 256, which comprises, among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving, from a first device, first audio data representing a first utterance;
determining a first number of words represented in the first audio data;
determining user profile data associated with the first utterance;
determining, in the user profile data, an average number of words of a user command;
determining the first number of words deviates from the average number of words;
determining template text data based at least in part on the first number of words deviating from the average number of words;
receiving, from a second device, first text data responsive to the first utterance;
populating the template text data with the first text data to generate second text data;
performing text-to-speech (TTS) processing on the second text data to generate second audio data, the second audio data corresponding to a non-default characteristic of speech based at least in part on the first number of words deviating from the average number of words; and
causing the first device to emit audio corresponding to the second audio data.

2. The computer-implemented method of claim 1, further comprising:
receiving, from the first device, third audio data representing a second utterance;
determining third text data responsive to the second utterance;
determining an electronic calendar associated with the user profile data;
determining the electronic calendar represents a first user will be busy within a threshold amount of time of receipt of the third audio data; and
performing TTS processing on the third text data to generate third audio data, the third audio data having a first rate of speech based at least in part on the electronic calendar representing the first user will be busy within the threshold amount of time, the first rate of speech being greater than a default rate of speech.

3. The computer-implemented method of claim 1, further comprising:
receiving third audio data representing a second utterance;
determining the user profile data is associated with the second utterance;
based at least in part on the user profile data being associated with the first utterance and the second utterance, determining an amount of time between receipt of the first audio data and receipt of the third audio data;
determining third text data responsive to the second utterance; and
performing, based at least in part on the amount of time, TTS processing on the third text data.

4. The computer-implemented method of claim 1, further comprising:
receiving third audio data representing a second utterance;
performing automatic speech recognition (ASR) processing on the third audio data to generate third text data;
performing natural language understanding (NLU) processing on the third text data to generate NLU results data;
determining the NLU results data represents a first speed that content is to be output at;
determining first content responsive to the second utterance; and
causing the first content to be output at the first speed.

5. The computer-implemented method of claim 1, further comprising:
receiving third audio data representing a second utterance;
performing automatic speech recognition (ASR) processing on the third audio data to generate third text data;
performing natural language understanding (NLU) processing on the third text data to generate NLU results data;
determining the NLU results data represents at least a first portion to be omitted from content to be output;
determining first content responsive to the second utterance; and
causing the first content to be output without the at least a first portion.

6. The computer-implemented method of claim 1, further comprising:
receiving third audio data representing a second utterance;
determining third text data responsive to the second utterance;
determining the user profile data is associated with the third audio data;
determining a geographic location represented in the user profile data; and
performing, based at least in part on the geographic location, TTS processing on the third text data.

7. A system, comprising:
at least one processor; and
at least one memory including instructions that, when executed by the at least one processor, cause the system to:
receive first audio data representing a first utterance, the first audio data being associated with user profile data;
determine first text data responsive to the first utterance;
perform text-to-speech (TTS) processing on the first text data to generate second audio data;
cause a first device to output audio corresponding to the second audio data;
receive third audio data representing a second utterance, the third audio data being associated with the user profile data;
based at least in part on the user profile data being associated with the first audio data and the third audio data, determine an amount of time between receipt of the first audio data and receipt of the third audio data;
determine, based at least in part on the amount of time, second text data responsive to the second utterance; and
perform TTS processing on the second text data.

8. The system of claim 7, wherein the at least one memory further includes instructions that, when executed by the at least one processor, further cause the system to:
receive fourth audio data representing a third utterance, the fourth audio data being associated with the user profile data;
determine third text data responsive to the third utterance;
determine an electronic calendar associated with the user profile data;
determine the electronic calendar indicates a first user will be busy within a threshold amount of time from when the fourth audio data was received; and perform, based at least in part on the electronic calendar indicating the first user will be busy, TTS processing on the third text data.

9. The system of claim 8, wherein the at least one memory further includes instructions that, when executed by the at least one processor, further cause the system to:
determine the electronic calendar includes an entry with a starting time prior to a first time at which an entirety of second audio, corresponding to the third text data, would be output using default characteristics.

10. The system of claim 7, wherein the at least one memory further includes instructions that, when executed by the at least one processor, further cause the system to:
receive fourth audio data representing a third utterance;
perform automatic speech recognition (ASR) processing on the fourth audio data to generate third text data;
perform natural language understanding (NLU) processing on the third text data to generate NLU results data;
determine the NLU results data represents a first speed that content is to be output at;
determine first content responsive to the third utterance; and
cause the first content to be output at the first speed.

11. The system of claim 7, wherein the at least one memory further includes instructions that, when executed by the at least one processor, further cause the system to:
receive fourth audio data representing a third utterance;
perform automatic speech recognition (ASR) processing on the fourth audio data to generate third text data;
perform natural language understanding (NLU) processing on the third text data to generate NLU results data;
determine the NLU results data represents at least a first portion to be omitted from content to be output;
determine first content responsive to the third utterance; and
cause the first content to be output without the at least a first portion.

12. The system of claim 7, wherein the at least one memory further includes instructions that, when executed by the at least one processor, further cause the system to:
receive fourth audio data representing a third utterance, the fourth audio data being associated with the user profile data;
determine third text data responsive to the third utterance;
determine a geographic location represented in the user profile data; and
perform, based at least in part on the geographic location, TTS processing on the third text data.

13. The system of claim 7, wherein the at least one memory further includes instructions that, when executed by the at least one processor, further cause the system to:
receive fourth audio data representing a third utterance;
determine third text data responsive to the third utterance;
perform TTS processing on the third text data to generate fifth audio data;
cause the first device to output second audio corresponding to the fifth audio data;
after the first device has begun outputting the second audio, but prior to the first device completing outputting the second audio, receive sixth audio data representing a fourth utterance;
determine the fourth utterance corresponds to a request to change an output speed of the second audio; and
cause the output speed to be changed.

14. A computer-implemented method, comprising:
receiving first audio data representing a first utterance, the first audio data being associated with user profile data;
determining first text data responsive to the first utterance;
performing text-to-speech (TTS) processing on the first text data to generate second audio data;
causing a first device to output audio corresponding to the second audio data;
receiving third audio data representing a second utterance, the third audio data being associated with the user profile data;
based at least in part on the user profile data being associated with the first audio data and the third audio data, determining an amount of time between receipt of the first audio data and receipt of the third audio data;
determining second text data responsive to the second utterance; and
performing, based at least in part on the amount of time, TTS processing on the second text data.

15. The computer-implemented method of claim 14, further comprising:
receiving fourth audio data representing a third utterance;
determining the third utterance corresponds to a request to change an output speed of second audio corresponding to the second text data; and
causing the output speed to be changed.

16. The computer-implemented method of claim 14, further comprising:
receiving fourth audio data representing a third utterance;
performing automatic speech recognition (ASR) processing on the fourth audio data to generate third text data;
performing natural language understanding (NLU) processing on the third text data to generate NLU results data;
determining the NLU results data represents a first speed that content is to be output at;
determining first content responsive to the third utterance; and
causing the first content to be output at the first speed.

17. The computer-implemented method of claim 14, further comprising:
receiving fourth audio data representing a third utterance;
performing automatic speech recognition (ASR) processing on the fourth audio data to generate third text data;
performing natural language understanding (NLU) processing on the third text data to generate NLU results data;
determining the NLU results data represents at least a first portion to be omitted from content to be output;
determining first content responsive to the third utterance; and
causing the first content to be output without the at least a first portion.

18. The computer-implemented method of claim 14, further comprising:
receiving fourth audio data representing a third utterance, the fourth audio data being associated with the user profile data;
determining third text data responsive to the third utterance;
determining a geographic location represented in the user profile data; and
performing, based at least in part on the geographic location, TTS processing on the third text data.

19. The computer-implemented method of claim 14, further comprising:
receiving fourth audio data representing a third utterance, the fourth audio data being associated with the user profile data;

determining third text data responsive to the third utterance;
determining an electronic calendar associated with the user profile data;
determining the electronic calendar indicates a first user will be busy within a threshold amount of time from when the fourth audio data was received; and
performing, based at least in part on the electronic calendar indicating the first user will be busy, TTS processing on the third text data.

20. The computer-implemented method of claim 19, further comprising:
determining the electronic calendar includes an entry with a starting time prior to a first time at which an entirety of second audio, corresponding to the third text data, would be output using default characteristics.

* * * * *